(12) United States Patent
Hirayama et al.

(10) Patent No.: US 10,564,535 B2
(45) Date of Patent: Feb. 18, 2020

(54) PROJECTION TYPE IMAGE DISPLAY APPARATUS AND INFORMATION DISPLAY METHOD ON PROJECTION TYPE IMAGE DISPLAY APPARATUS

(71) Applicant: MAXELL, LTD., Kyoto (JP)

(72) Inventors: Koji Hirayama, Kyoto (JP); Takuya Shimizu, Kyoto (JP)

(73) Assignee: Maxell, Ltd., Kyoto (JP)

(*) Notice: Subject to any disclaimer, the term of this patent is extended or adjusted under 35 U.S.C. 154(b) by 0 days.

(21) Appl. No.: 15/566,227

(22) PCT Filed: Apr. 16, 2015

(86) PCT No.: PCT/JP2015/061731
§ 371 (c)(1),
(2) Date: Oct. 13, 2017

(87) PCT Pub. No.: WO2016/166868
PCT Pub. Date: Oct. 20, 2016

(65) Prior Publication Data
US 2018/0101089 A1    Apr. 12, 2018

(51) Int. Cl.
*G03B 21/20*    (2006.01)
*G03B 21/14*    (2006.01)
(Continued)

(52) U.S. Cl.
CPC .......... *G03B 21/2086* (2013.01); *G03B 21/00* (2013.01); *G03B 21/14* (2013.01);
(Continued)

(58) Field of Classification Search
CPC ..... G03B 21/006; G03B 21/16; G06F 1/1626; G06F 1/1686
See application file for complete search history.

(56) References Cited

U.S. PATENT DOCUMENTS 6,447,122 B1 * 9/2002 Kobayashi ........... G03B 21/006
353/97
7,019,737 B1    3/2006 Asai et al.
(Continued)

FOREIGN PATENT DOCUMENTS

JP    2003-209718 A    7/2003
JP    2003-281097 A    10/2003
(Continued)

OTHER PUBLICATIONS

International Search Report of PCT/JP2015/061731 dated Jun. 9, 2015.
(Continued)

*Primary Examiner* — Sultan Chowdhury
(74) *Attorney, Agent, or Firm* — Mattingly & Malur, PC

(57) ABSTRACT

A display of various types of information on a subdisplay provided to a main body of a projector can be maintained even after supply of power source is stopped. According to a representative embodiment, included are: a power source connection unit connecting a power supply line for supplying, from outside, power used in a projection type image display apparatus; a nonvolatile display device provided separately from an image projection unit and displaying at least character information; and a processing unit displaying information on one or more predetermined items on the nonvolatile display device, and a state of displaying information on the nonvolatile display device is maintained even in a state where the power supply line is not connected to the power source connection unit.

1 Claim, 18 Drawing Sheets

(51) Int. Cl.
*G03B 21/00* (2006.01)
*G03B 21/16* (2006.01)

(52) U.S. Cl.
CPC ......... *G03B 21/16* (2013.01); *G03B 21/2033* (2013.01); *G03B 21/006* (2013.01); *G03B 21/008* (2013.01)

(56) References Cited

U.S. PATENT DOCUMENTS

| | | | | |
|---|---|---|---|---|
| 8,297,758 | B2* | 10/2012 | Choi | G06F 1/1626 353/10 |
| 8,382,295 | B1* | 2/2013 | Kim | H04N 9/31 348/552 |
| 2008/0049192 | A1* | 2/2008 | Nozaki | G03B 17/00 353/25 |
| 2011/0066259 | A1* | 3/2011 | Suzuki | G05B 15/02 700/83 |
| 2015/0002829 | A1* | 1/2015 | Hirata | G03B 21/54 353/122 |

FOREIGN PATENT DOCUMENTS

| | | | |
|---|---|---|---|
| JP | 2004-029801 | A | 1/2004 |
| JP | 2004-37705 | A | 2/2004 |
| JP | 2005-152373 | A | 6/2005 |
| JP | 2005-221898 | A | 8/2005 |
| JP | 2006-039448 | A | 2/2006 |
| JP | 2008-112306 | * | 5/2008 |
| JP | 2008-112306 | A | 5/2008 |
| JP | 2008112306 | * | 5/2008 |
| JP | 2008-233599 | A | 10/2008 |
| JP | 2010-86089 | A | 4/2010 |
| JP | 2010-276818 | A | 12/2010 |
| JP | 2011-221739 | A | 11/2011 |
| JP | 2012-150082 | A | 8/2012 |

OTHER PUBLICATIONS

Japanese Office Action received in corresponding Japanese Application No. 2017-512151 dated Nov. 20, 2018.
Japanese Office Action received in corresponding Japanese Application No. 2017-512151 dated Sep. 3, 2019.

* cited by examiner (a)

OWNING ORGANIZATION NAME → | ***** Univ.

(b)

OWNING ORGANIZATION NAME → | ***** Univ.
NAME OF PERSON IN CHARGE → | Mr.Tanaka (c)

OWNING ORGANIZATION NAME → | ***** Univ.
NAME OF PERSON IN CHARGE → | Mr.Tanaka
CONTACT INFORMATION → | TEL:2282

(d)

LOGO MARK OF OWNING ORGANIZATION → | 
NAME OF PERSON IN CHARGE → | Mr.Tanaka
CONTACT INFORMATION → | TEL:2282

FILTER OPERATION TIME → | FILTER TIME     824h
LAMP OPERATION TIME  → | LAMP TIME       624h (b)

FILTER OPERATION TIME → | FILTER TIME    9587h
REPLACEMENT RECOMMENDATION { | PLEASE SET
MESSAGE                      | NEW FILTER (c)

MODEL NUMBER OF OPTIONAL LENS → | OP LENS #OP003

(a)

MANUFACTURER ⟶  Made by ∗∗ Company (b)

MANUFACTURER ⟶ Made by ∗∗ Company
MODEL NAME ⟶ Model #ABC001

(c)

MANUFACTURER ⟶ Made by ∗∗ Company
MODEL NAME ⟶ Model #ABC005
PERFORMANCE ⟶ WSXGA 9000lm 8000:1

(d)

COUNTRY OF MANUFACTURE ⟶  Made in ∗∗ Country (a)

(b)

(c)

(d)

(a)

NO-LAMP ATTACHED ERROR MESSAGE →

(b)

NO-LAMP ATTACHED ERROR MESSAGE →
MODEL NUMBER OF CORRESPONDING LAMP →

(c)

NO-LAMP ATTACHED ERROR MESSAGE →
CONTACT INFORMATION OR URL OF LAMP SELLER (a)

(b)

(a)

(b)

(a)

(b)

PROJECTION TYPE IMAGE DISPLAY APPARATUS AND INFORMATION DISPLAY METHOD ON PROJECTION TYPE IMAGE DISPLAY APPARATUS

TECHNICAL FIELD

The present invention relates to a technique of a projection type image display apparatus, particularly, to a technique effectively applied to a projection type image display apparatus having a subdisplay for displaying information and applied to an information display method by the projection type image display apparatus.

BACKGROUND ART

Some of projection type image display apparatuses such as liquid crystal projectors has, as a subdisplay on a back side portion of the apparatus besides a display unit that projects and displays an image onto a screen etc., a small liquid crystal display for displaying various types of information such as projected image information and a state of the apparatus.

For example, Japanese Patent Application Laid-open No. 2005-221898 (Patent Document 1) describes an apparatus: having a subscreen provided opposite a projection lens of a projector apparatus; and displaying the inputted image information to superimposedly display, on the image information, a message transmitted from a terminal apparatus.

Moreover, as a technique related to an apparatus having a subdisplay, for example, Japanese Patent Application Laid-open No. 2012-150082 (Patent Document 2) describes a vehicle navigation device including: a main display such as a liquid crystal display installed in the vicinity of a driver's seat and displaying a route guidance screen and a television screen; and a subdisplay arranged in the vicinity of a rear seat and displaying a route guidance screen, a screen of a television, a game, or the like, and discloses that so-called electronic paper may be used as the subdisplay.

Moreover, Japanese Patent Application Laid-open No. 2004-29801 (Patent Document 3) describes a technique of: using a display that utilizes a memory type reflective liquid crystal as a subdisplay of a personal computer; displaying, onto the subdisplay, fixed information not requiring frequent rewriting, a window to be inactive hiddenly on a main display of the personal computer, an image for enjoyment, and the like; and thereby enhancing efficiency of work such as editing by making effective use of a region of the main display.

RELATED ART DOCUMENTS

Patent Documents

Patent Document 1: Japanese Patent Application Laid-open No. 2005-221898
Patent Document 2: Japanese Patent Application Laid-open No. 2012-150082
Patent Document 3: Japanese Patent Application Laid-open No. 2004-29801

SUMMARY OF THE INVENTION

Problems to be Solved by the Invention

According to a configuration of providing the subdisplay in a projector main body to display thereon various types of information as described in Patent Document 1, various types of information such as information on an apparatus state including an error (s) etc. and identification information of the projector main body are displayed regardless of whether an image is being projected on a screen, thereby enabling a user to refer to the information. However, when the subdisplay is constituted by an ordinary liquid crystal display, the display on the subdisplay also disappears by a stop of supply of power source to the projector even if the various types of information as described above is being displayed.

For example, in a case where the projector has stopped due to an error(s), a person in charge of maintenance service needs work for starting up the projector in order to obtain information on a content etc. of the error, which becomes troublesome work in that the power source must be prepared for the staring-up. Moreover, since the projector is often used in a state of being constantly installed at a predetermined place, it is effective to clearly indicate the identification information etc. on the projector for security of prevention and suppression etc. against theft. However, the security is unuseful in that: there is a possibility of being peeled off if a label(s) etc. are attached thereto; and the display by the subdisplay as described in Patent Document 1 disappears if supply of the power source stops.

In contrast, various apparatuses described in Patent Documents 2 and 3, etc. use a rewritable nonvolatile display device such as electronic paper as a subdisplay, and can maintain the display content of the subdisplay even when the supply of the power source stops. However, any of these apparatuses is a direct view type display whose main display is a liquid crystal display etc., and is not intended to a projection type display whose main display is a projector etc. Moreover, the subdisplay mainly takes into consideration portability of and independence from the main display and an apparatus main body and, thus, is not a display directly provided to the apparatus main body.

Therefore, an object of the present invention is to provide a projection type image display apparatus capable of maintaining the display of the various types of information on a subdisplay provided to a main body of the projector even after the supply of the power source stops, and to provide an information display method on the projection type image display apparatus.

The above and other objects and novel characteristics of the present invention will be apparent from the description of the present specification and the accompanying drawings.

Means for Solving the Problems

The following is a brief description of an outline of the typical invention disclosed in the present application.

A projection type image display apparatus according to a typical embodiment disclosed in the present invention has an image projection unit for using light from a light source to project an image, the apparatus includes: a power source connection unit connecting a power supply line for supplying, from outside, power used in the projection type image display apparatus; a nonvolatile display device provided separately from the image projection unit and displaying at least character information; and a processing unit having information on one or more predetermined items displayed on the nonvolatile display device, and a state of displaying information on the nonvolatile display device is maintained even in a state where the power supply line is not connected to the power source connection unit.

Effects of the Invention

The effects obtained by typical embodiments of the invention disclosed in the present application will be briefly described below.

That is, according to a representative embodiment of the present invention, it is possible to maintain the display of the various types of information on the subdisplay provided to the main body of the projector even after the supply of the power source is stopped.

BRIEF DESCRIPTIONS OF THE DRAWINGS

Figure 13:
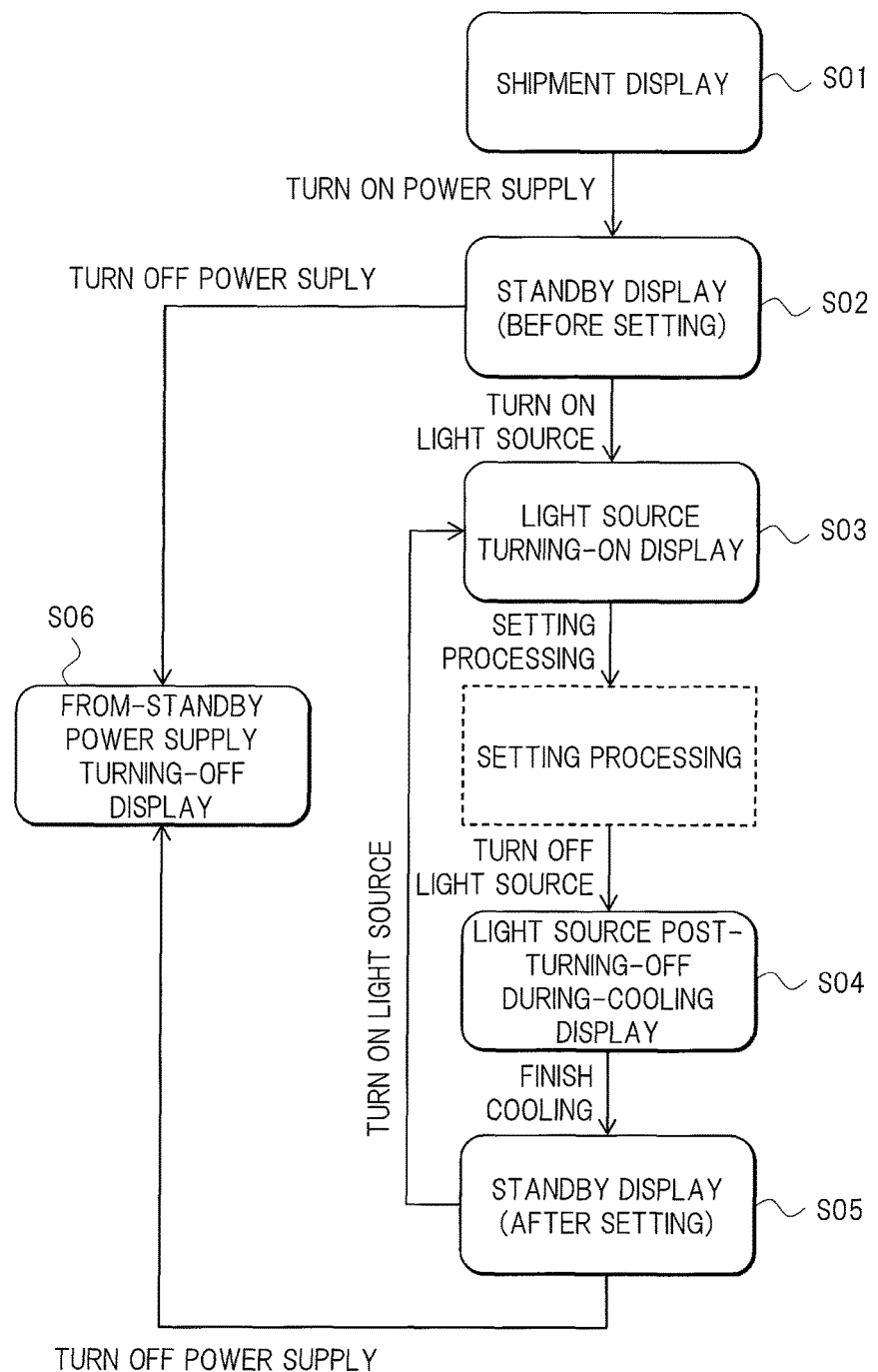
Figure 14:
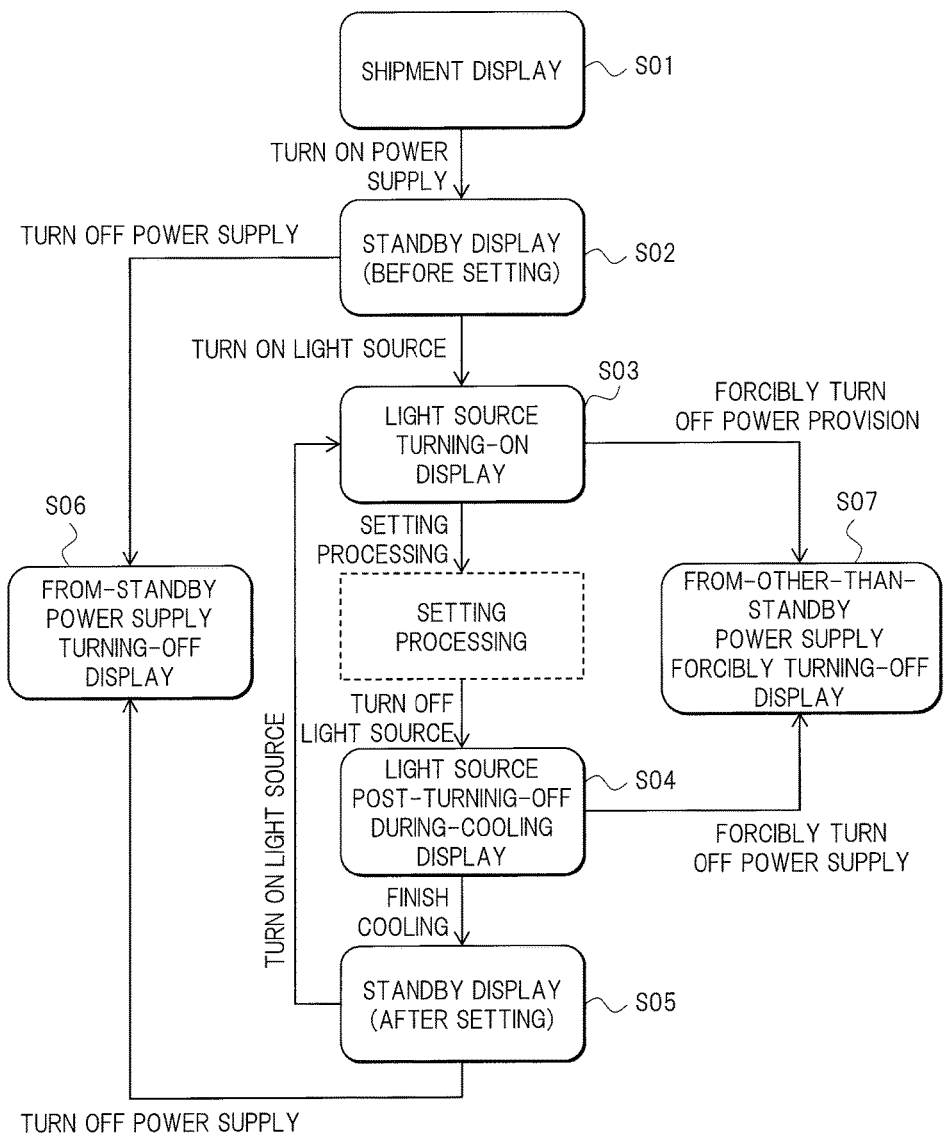
Figure 15:
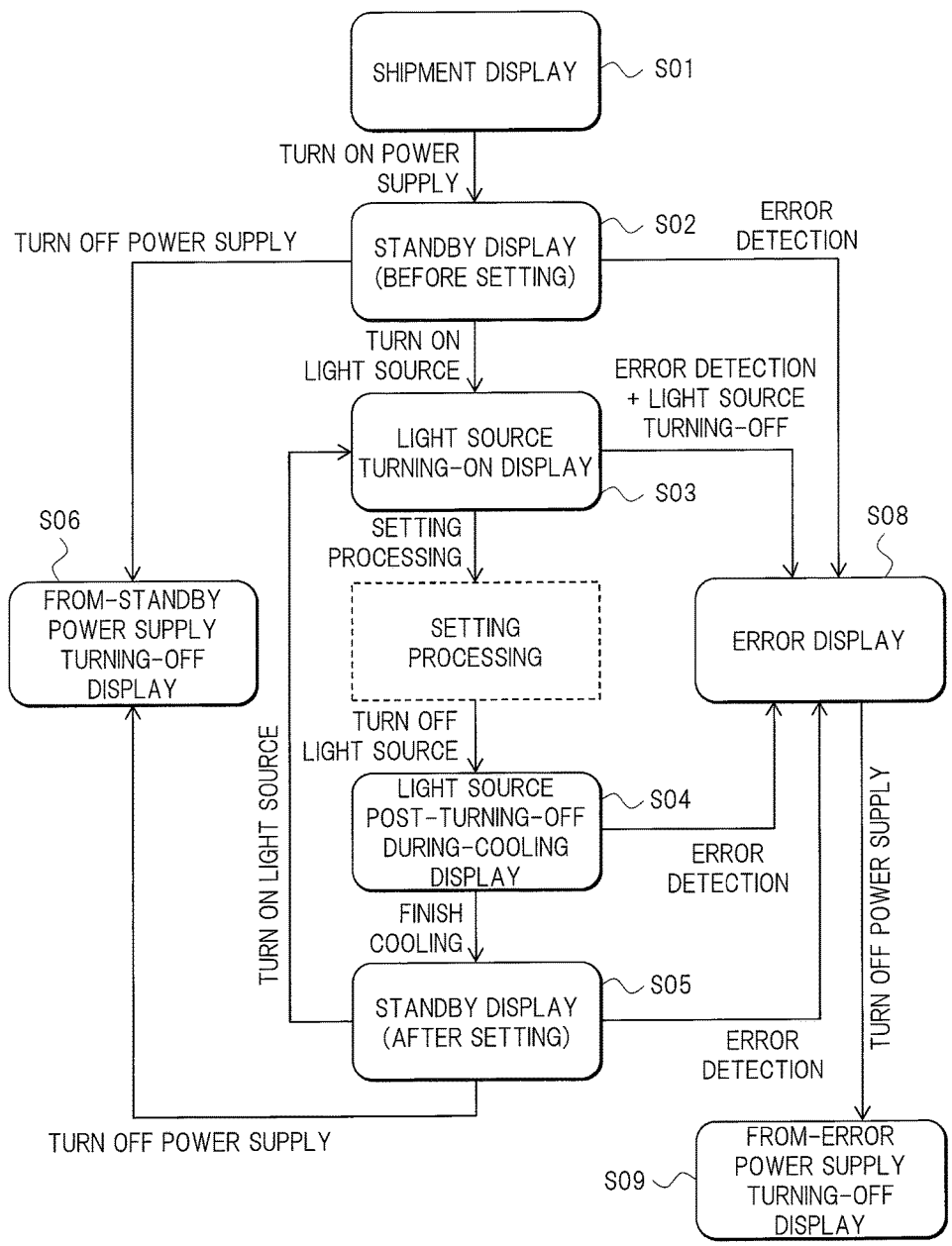
Figure 16:
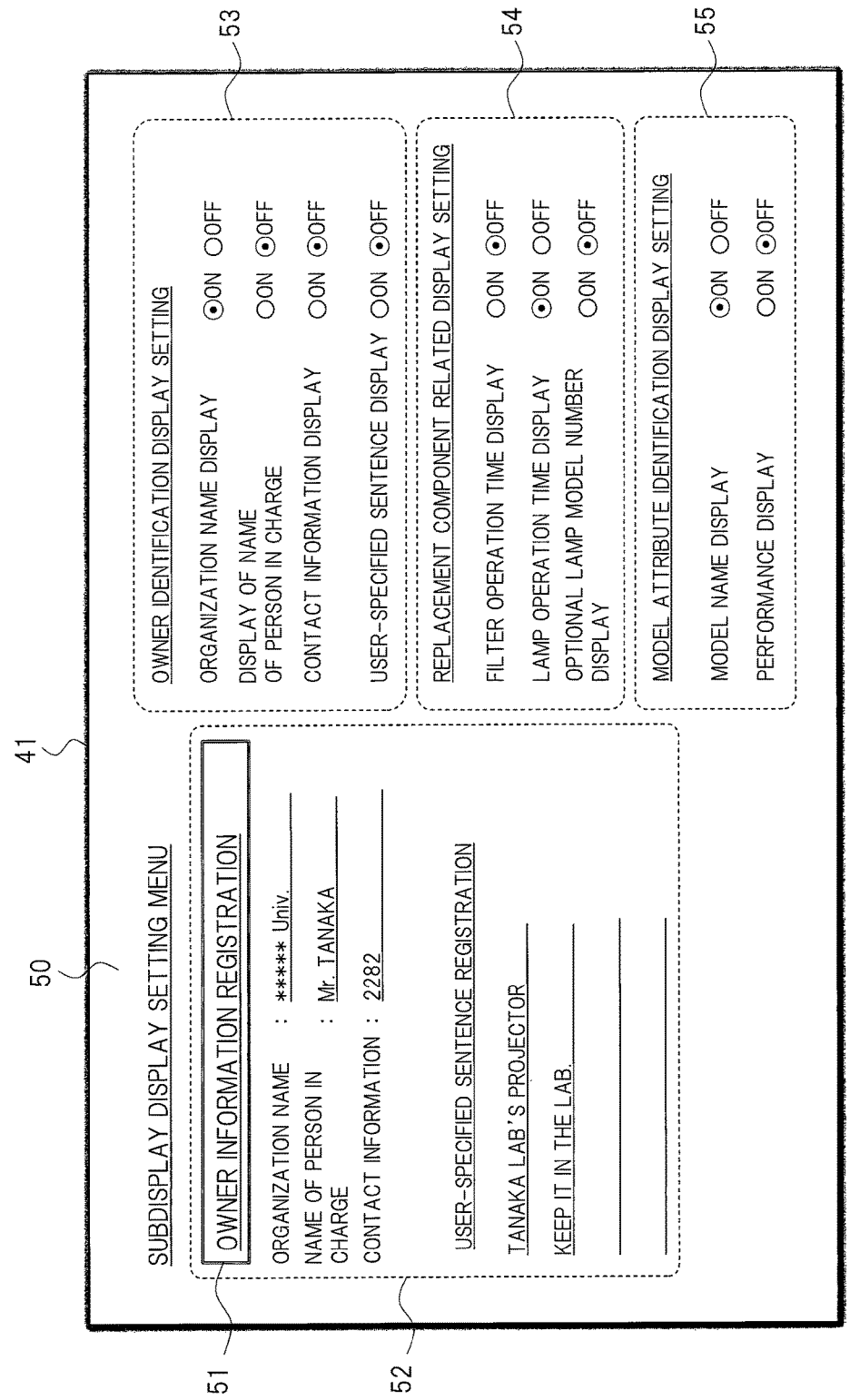
Figure 17:
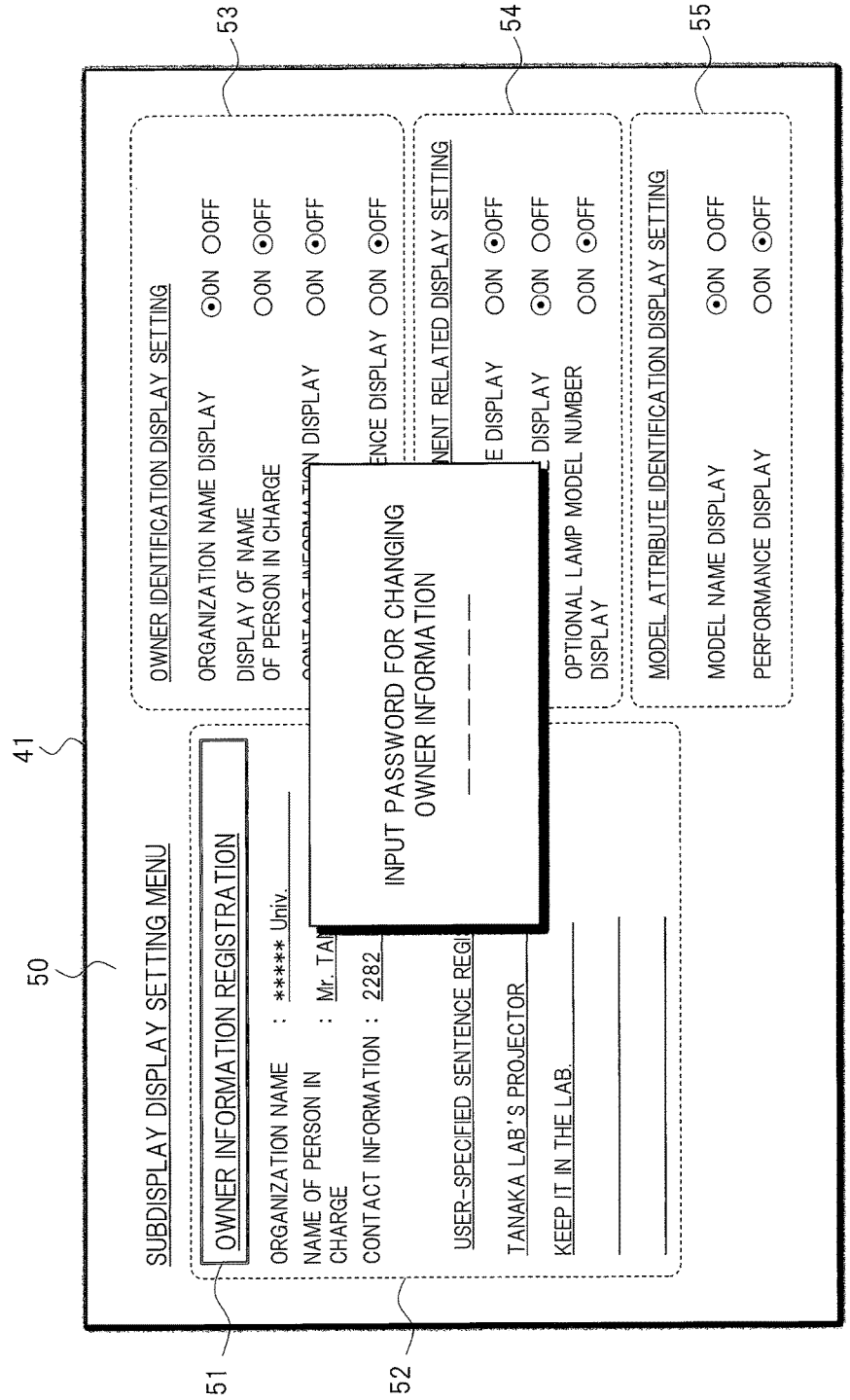
Figure 18:
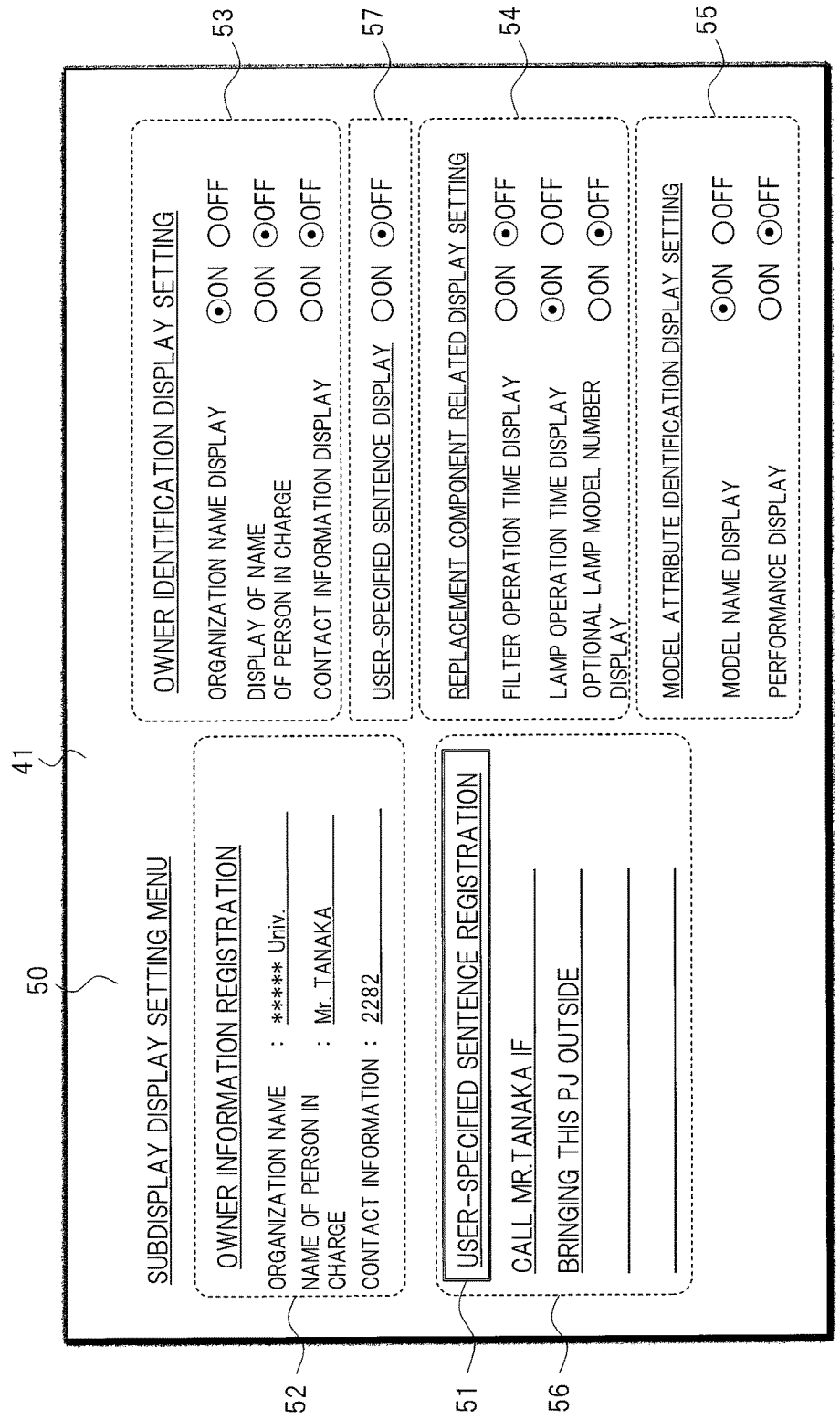
Figure 19:
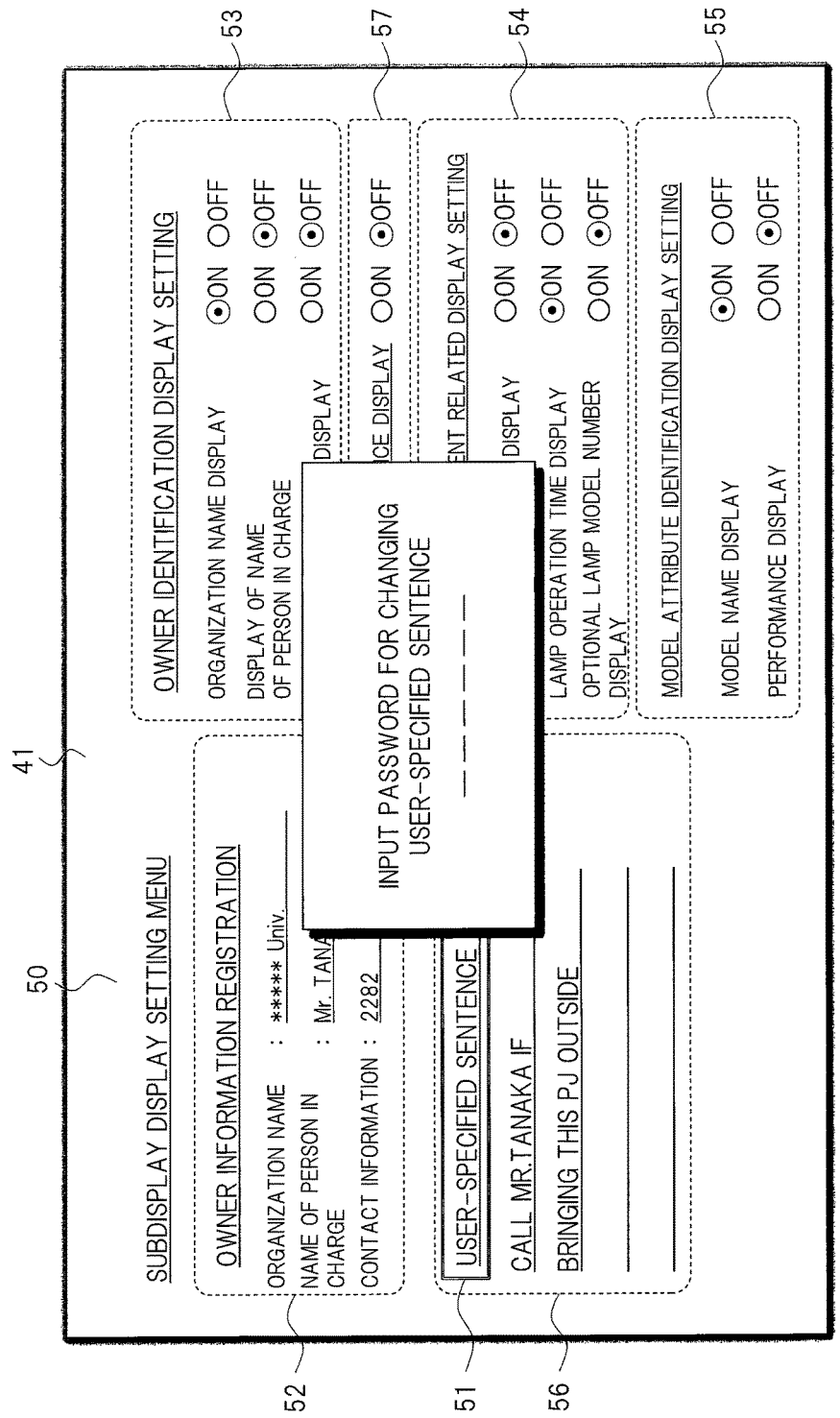

FIGS. 3(a) to 3(d) are diagrams illustrating an outline about an example of an owner identification display according to an embodiment of the present invention;

FIGS. 4(a) and 4(b) are diagrams illustrating an outline about an example of an operation state display according to an embodiment of the present invention;

FIGS. 5(a) and 5(b) are diagrams illustrating an outline about an example of a during-cooling display according to an embodiment of the present invention;

FIGS. 6(a) to 6(c) are diagrams illustrating an outline about an example of a replacement component related display according to an embodiment of the present invention;

FIGS. 7(a) to 7(d) are diagrams illustrating an outline about an example of a model attribute identification display according to an embodiment of the present invention;

FIGS. 8(a) to 8(d) are diagrams illustrating an outline about an example of an error display according to an embodiment of the present invention;

FIGS. 9(a) to 9(c) are diagrams illustrating an outline about an example of an error display according to an embodiment of the present invention;

FIGS. 10(a) and 10(b) are diagrams illustrating an outline about an example of displaying information in each of two regions of a general state display region and an owner identification display region according to an embodiment of the present invention;

FIGS. 11(a) and 11(b) are diagrams illustrating an outline about an example of displaying information in each of two regions of the general state display region and a model attribute identification display region according to an embodiment of the present invention;

FIGS. 12(a) and 12(b) are diagrams illustrating an outline about an example of displaying information in each of three regions according to an embodiment of the present invention;

FIG. 13 is a diagram illustrating an outline about an example of a transition of a normal screen display content according to an embodiment of the present invention;

FIG. 14 is a diagram illustrating an outline about an example of a transition of a screen display content in a case where supply of power source is forcibly turned off from a state other than standby according to an embodiment of the present invention;

FIG. 15 is a diagram illustrating an outline about an example of a transition of a screen display content in a case where an error(s) according to an embodiment of the present invention is detected;

FIG. 16 is a diagram illustrating an outline about an example of a setting menu screen for setting a display content etc. of a nonvolatile display device according to an embodiment of the present invention;

FIG. 17 is a diagram illustrating an outline about an example of a setting menu screen for setting a display content etc. of a nonvolatile display device according to an embodiment of the present invention;

FIG. 18 is a diagram illustrating an outline about an example of a setting menu screen for setting a display content etc. of a nonvolatile display device according to an embodiment of the present invention; and FIG. 19 is a diagram illustrating an outline about an exemplary of a setting menu screen for setting a display content or the like of a nonvolatile display device according to an embodiment of the present invention.

DETAILED DESCRIPTION OF PREFERRED EMBODIMENTS

Hereinafter, embodiments of the present invention will be described in detail with reference to the accompanying drawings. Note that components having the same function are denoted by the same reference characters throughout the drawings for describing the embodiments, and the repetitive description thereof will be omitted.

<Apparatus Configuration>

Figure 1:
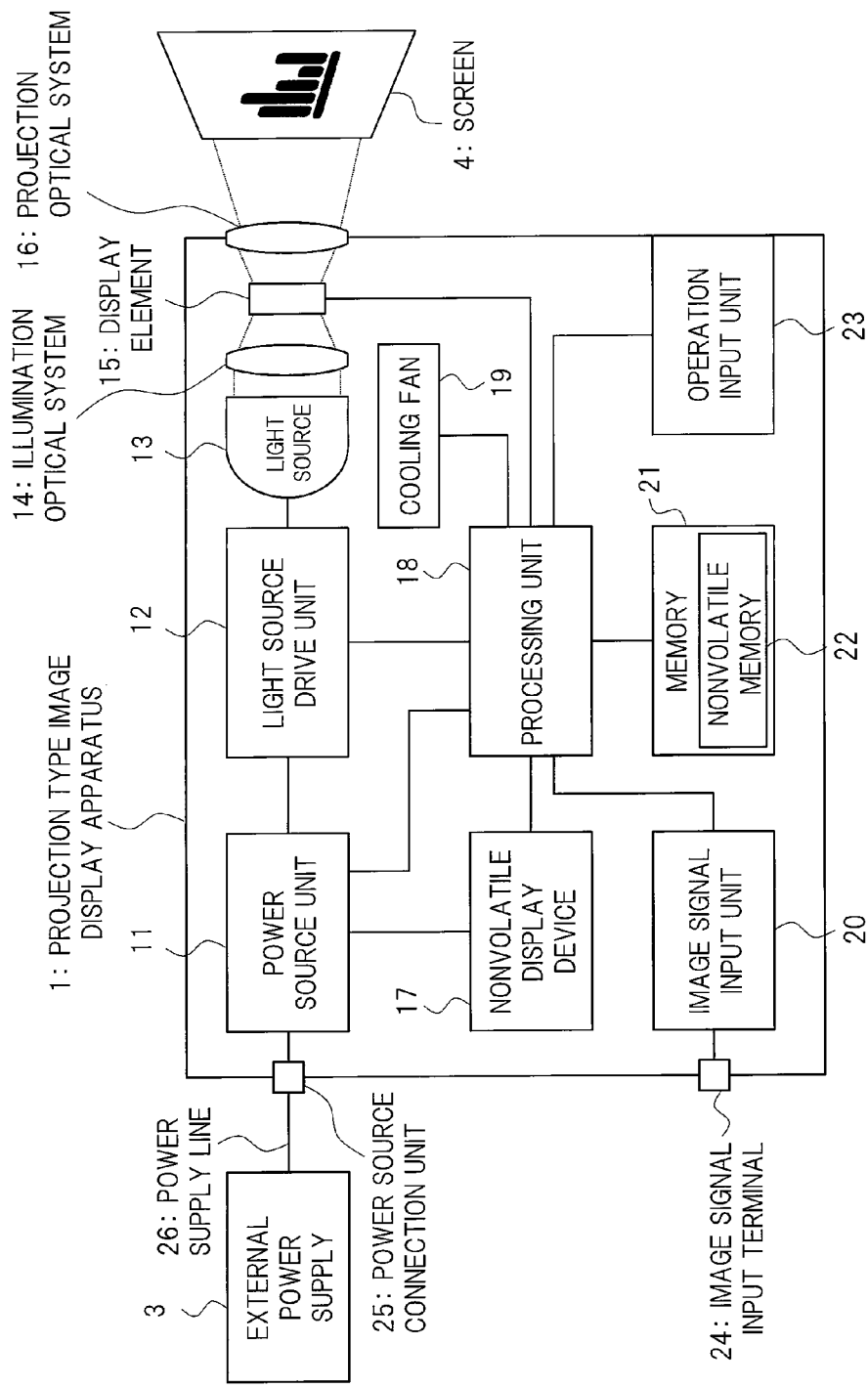
FIG. 1 is a block diagram illustrating an outline about a configuration example of a projection type image display apparatus according to an embodiment of the present invention.
Figure 2:
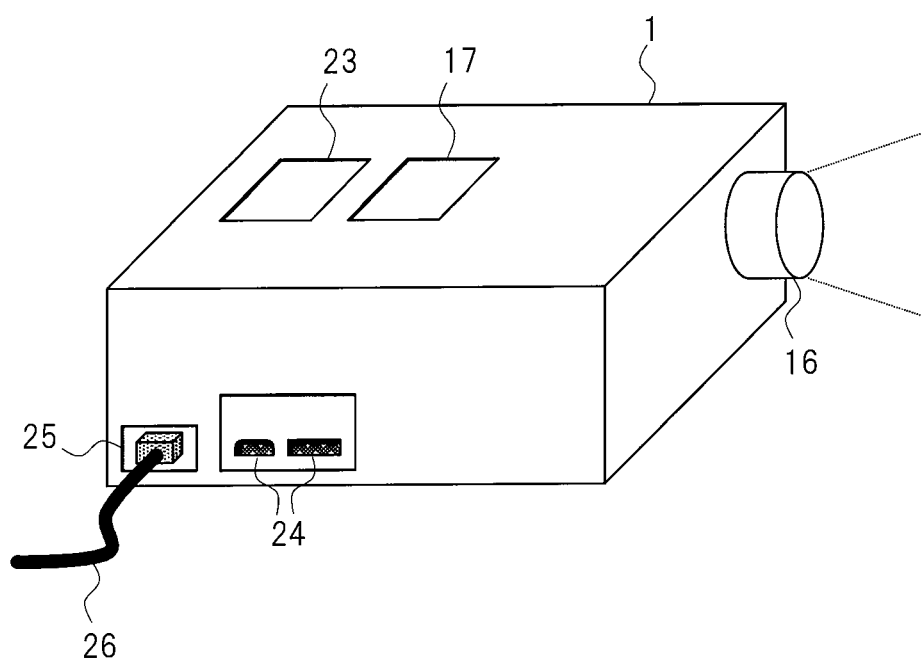
FIG. 2 is a perspective view illustrating an outline about an example of an appearance of a projection type image display apparatus according to an embodiment of the present invention.

FIG. 1 is a block diagram illustrating an outline about a configuration example of a projection type image display apparatus according to an embodiment of the present invention. FIG. 2 is a perspective view illustrating an outline about an example of an appearance of a projection type image display apparatus according to the present embodiment. In FIG. 1, a projection type image display apparatus 1 is, for example, a liquid crystal projector etc. that receive power supply from external power supply 3 to project and enlargedly display an image(s) onto a screen 4.

The projection type image display apparatus 1 includes respective components of, for example, a power source unit 11, a light source drive unit 12, a light source 13, an illumination optical system 14, a display element 15, a projection optical system 16, a nonvolatile display device 17, a processing unit 18, a cooling fan 19, an image signal input unit 20, a memory 21, a nonvolatile memory 22, an operation input unit 23, an image signal input terminal 24, a power source connection unit 25, and a power supply line 26, etc., all of which are mounted by hardware and various types of device, etc.

As illustrated in the example of FIG. 2, the power source unit 11 receives power supply from the external power supply 3 connected by the power supply line 26 via the power source connection unit 25, and supplies drive power to the respective components of the light source drive unit 12, the nonvolatile display device 17, and the processing unit 18. The present embodiment describes a case where the power supply is directly switched on/off by connecting or disconnecting the power supply line 26. However, a power source switch or the like (not illustrated) is provided, and the power supply may be switched on/off by turning the power source switch on/off on the premise that the power supply line 26 is connected.

The light source drive unit 12 drives the light source 13 to emit light in accordance with control from the processing unit 18 to be described below. The light source 13 uses, for example, a high pressure mercury lamp, a xenon lamp, an light emitting diode (LED) light source, and a laser light source, etc. The illumination optical system 14 is an optical system constituted by one or more lenses for converging the light emitted from the light source 13. The display element 15 is an element for forming an image(s) to be projected on the basis of an image signal from the processing unit 18, and is constituted by a transmissive or reflective liquid crystal panel (or a digital micromirror device (DMD)(registered trademark) panel), or the like. An image is projected by transmitting or reflecting the light converged by the illumination optical system 14. The projection optical system 16 is an optical system constituted by one or more lenses for enlarging the projection image from the display element 15 and projecting it onto the screen 4. These components constitute an image projection unit.

The nonvolatile display device 17 is, for example, a device such as electronic paper constituting a subdisplay provided to an exterior of the projection type image display apparatus 1 as illustrated in the example in FIG. 2. Various types of information are displayed on the display on the basis of an output signal from the processing unit 18 in accordance with a state of the projection type image display apparatus 1. Although at least character information is set to be displayed, an image may be displayed. Due to nonvolatility, it is possible to maintain the display content even when the supply of power from the external power supply 3 via the power source unit 11 is stopped. Control of the display content of the nonvolatile display device 17 will be detailed below.

By operating a microcomputer and/or executing a program by a central processing unit (CPU), for example, the processing unit 18 functions to control operations of the respective components of the projection type image display apparatus 1 such as formation of a projection image on the display element 15, projection of the image under control of the light source 13, and control of a display content of the nonvolatile display device 17. The cooling fan 19 is a fan for suppressing an increase in a temperature applied to the components by discharging heat generated by the light source 13 to the outside. The fan is controlled by the processing unit 18 so as to operate by an interval of a predetermined time or by falling below a predetermined temperature even after the projection of the image onto the screen 4 is finished and the light source 13 stops light emission.

The image signal input unit 20 is an external interface that receives an input of an image signal to be projected from an information processing terminal such as a not-shown personal computer (PC) connected via the image signal input terminal 24 as illustrated in the example in FIG. 2, and that transmits the signal to the processing unit 18. Incidentally, the image signal input terminal 24 may have a plurality of types of interface such as a high-definition multimedia interface (HDMI), a video graphics array (VGA), and a digital visual interface (DVI).

The memory 21 is a built-in memory of the projection type image display apparatus 1, in which, for example, the processing unit 18 buffers the image signal inputted from the image signal input unit 20, and which develops various setting information or the like onto a table and stores the developed information. The memory 21 includes the nonvolatile memory 22 such as a flash memory in addition to a volatile memory such as a dynamic random access memory (DRAM), thereby making it possible to retain information related to the state or the like of the projection type image display apparatus 1 and/or various types of setting information etc. even when the supply of power source is stopped.

The operation input unit 23 is an external interface that receives an input of an instruction from the user toward the projection type image display apparatus 1 by operating a button, or the like (not illustrated) via a panel or the like provided to the exterior of the projection type image display apparatus 1 as illustrated in the example of FIG. 2, and transmits the instruction to the processing unit 18. An operation by a remote controller or the like (not illustrated) may be received. By the operation via the operation input unit 23, the user can display, on a projection screen on the screen 4 or on the subdisplay (nonvolatile display device 17), a setting menu screen to be described below, and register the various types of setting information, or the like.

<Screen Display Example of Subdisplay (Nonvolatile Display Device 17)>

Figure 3:

FIGS. 3 to 12 are diagrams each illustrating an outline about an example of a content displayed on the screen of the nonvolatile display device 17. FIG. 3 is a diagram illustrating an outline about an example of an owner identification display. The owner identification display is a display for identifying an owner(s) by: an organization name or a name of a person in charge who owns the projection type image display apparatus 1; his/her contact information, and the like. The display content can be registered by the user via the setting menu screen described below.

FIG. 3(a) illustrates an example of displaying only an owning organization name is displayed, and FIG. 3(b) illustrates an example of displaying a name of a person in charge in addition to the owning organization name. FIG. 3(c) further illustrates an example of displaying contact information. Turning-on/off of a display about each of these pieces of information can also be registered by the user via the setting menu. Alternatively, as illustrated in FIG. 3(d), displayed on image data specified by the user may be a logo mark etc. of an owning organization instead of the owning organization name. This image data can be obtained from an external apparatus or an external medium via: a data input/output interface such as a not-shown universal serial bus (USB); and/or a network interface.

The owner identification display is not limited to the above-described display pattern, and may be displayed in a custom display mode in which the user can specify and display an arbitrary character(s) or the like via the setting menu. Moreover, the display content may be maintained as it is even when the power supply line 26 is disconnected and the power supply is stopped by the function of the nonvolatile display device 17. Thus, the content of the owner identification display remains without being deleted, so that security for a protection etc. against theft can be improved.

Figure 4:
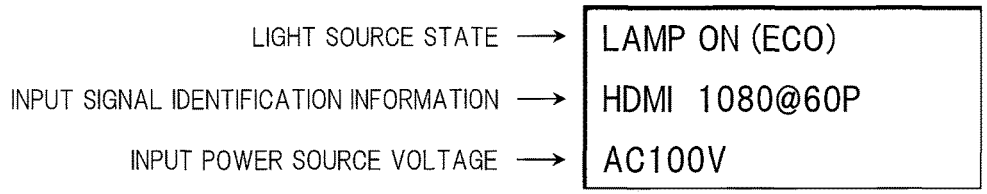
Figure 4:
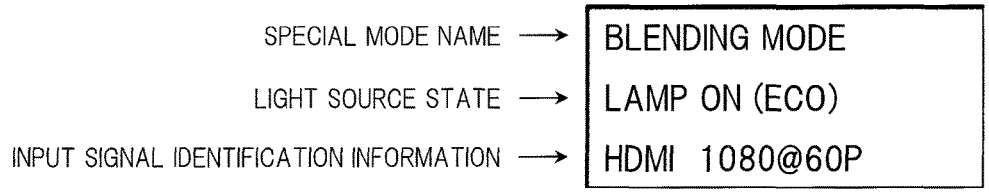

FIG. 4 is a diagram illustrating an outline of an example about an operation state display. The operation state display is a display for notifying the user of information indicating various types of state when the light source 13 is being turned on, that is, when the projection type image display apparatus 1 is in operation. FIG. 4(a) illustrates an example of displaying each of information of a light source state, input signal identification information, and an input power source voltage. The light source state is, for example, information on lighting modes of the light source 13 (lamp) that is in a "ordinary mode" and an "eco mode", etc.

Moreover, the input signal identification information is identification information on types etc. of the image signal inputted via the image signal input terminal 24. The input power source voltage is information on the power source voltage supplied via the power source connection unit 25.

FIG. 4(*b*) illustrates an example of displaying each piece of information on a special mode name, a light source state, and input signal identification information. The special mode name is information indicating whether a mode using a special function such as an automatic correction function of edge blending and warping, etc. operates or not. The light source state and the input signal identification information are similar to the case in FIG. 4(*a*), but their display positions may be changed as illustrated in FIG. 4(*b*).

Figure 5:
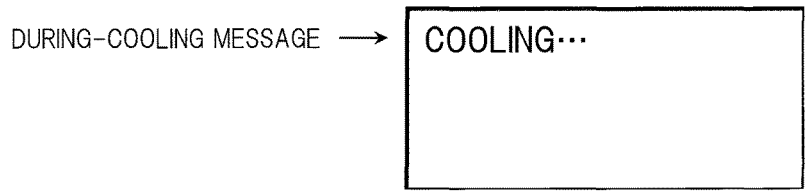
Figure 5:
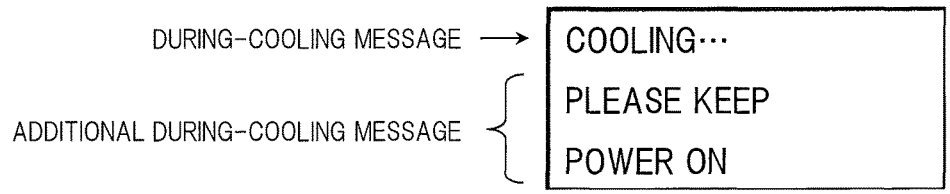

FIG. 5 is a diagram illustrating an outline about an example of a during-cooling display. The during-cooling display is a display for notifying the user that a cooling processing by the cooling fan 19 is being performed after the light source 13 is turned off. FIG. 5(*a*) illustrates an example of displaying only a during-cooling message indicating that cooling is in operation, and FIG. 5(*b*) illustrates an example of further displaying additional during-cooling messages indicating cautions, instructions, or the like.

FIG. 6 is a diagram illustrating an outline about an example of a replacement component related display. The replacement component related display is a display for notifying the user of information on an operation time etc. of a replaceable light source 13 (lamp) and a replaceable component such as an intake filter (not illustrated). FIG. 6(*a*) illustrates an example of displaying the information indicating the operation time of the filter and the operation time of the light source 13 (lamp). FIG. 6(*b*) illustrates an example of displaying a replacement recommendation message in addition to the information on the operation time in a case, for example, where the operation time of the filter exceeds a threshold recommended for replacement. This is similarly applicable to a case where an operation time of the light source 13 (lamp) exceeds a threshold recommended for replacement.

In the case of the projection type image display apparatus 1 in which the projection optical system 16 (projection lens) is replaceable, there may be a mode for displaying a model number of the currently attached replaceable lens (optional lens) in accordance with an instruction etc. from the user. FIG. 6(*c*) illustrates an example of displaying a model number of the optional lens.

In many cases of the projection type image display apparatus 1, the replaceable lens is not exposed significantly from an apparatus exterior, which makes it difficult to confirm its model or the like. Conventionally, in order to confirm the model or the like, there is a need to directly check the replaceable lens by removing a part of an exterior cover, or to check the model number etc. by connecting the power supply line 26, then starting up the projection type image display apparatus 1, and projecting an image of the menu screen etc. In contrast, if the model number of the replaceable lens (optional lens) is displayed on the nonvolatile display device 17 as described in the present embodiment, it is possible to confirm the model number of the optional lens, for example, even in a state where the power supply line 26 is not connected due to maintenance work or the like, which can significantly enhance efficiency of the maintenance work.

Figure 7:
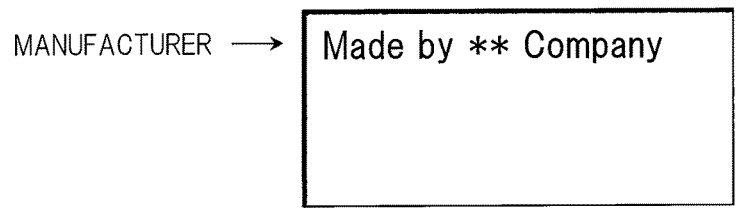
Figure 7:
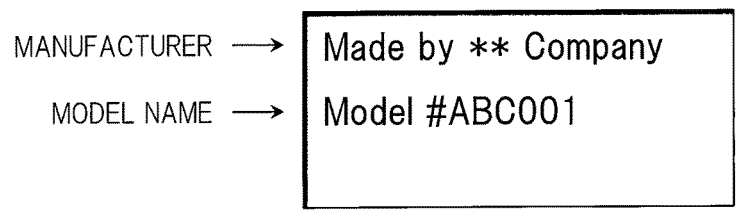
Figure 7:
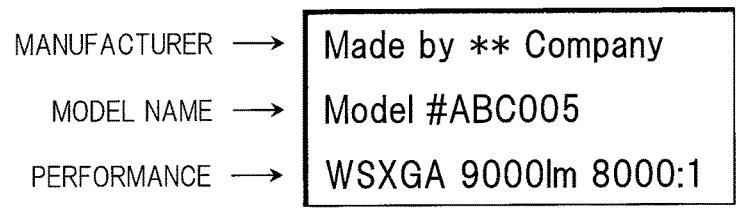
Figure 7:
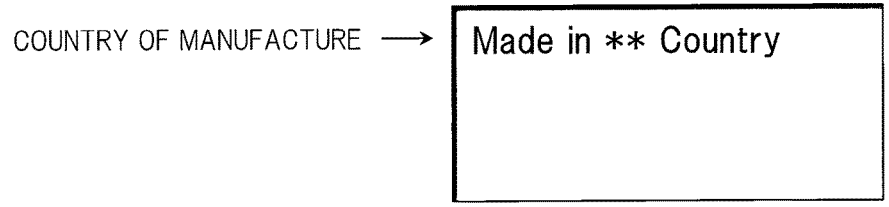

FIG. 7 is a diagram illustrating an outline about an example of a model attribute identification display. The model attribute identification display is a display of attribute information on, for example, a manufacturer (maker), a model name (model number), performance (specification), and a country of manufacture, etc. of the projection type image display apparatus 1. These pieces of specific information on the projection type image display apparatus 1 are to be recorded in advance in the nonvolatile memory 22 or the like at the time of manufacturing, and can be protected so as not to be altered by the user via the setting menu or the like.

FIG. 7(*a*) illustrates an example of displaying only manufacturer, and FIG. 7(*b*) illustrates an example of displaying a model name in addition to the manufacturer. FIG. 7(*c*) illustrates an example of further displaying performance information. FIG. 7(*d*) illustrates an example of displaying only a country of manufacture. By indicating, on the nonvolatile display device 17, the model attribute identification display as described in the present embodiment, it is possible to perform the model attribute identification display, for example, even at the time of shipment without the power supply. This makes it possible to suppress so illegal resale or the like that a third party having got the projection type image display apparatus 1 through a purchase etc. improperly alters the attribute information on the manufacturer, the model, the performance, and the country of manufacture, etc.

Figure 8:
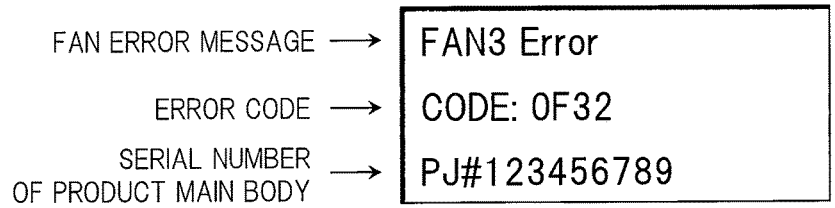
Figure 8:
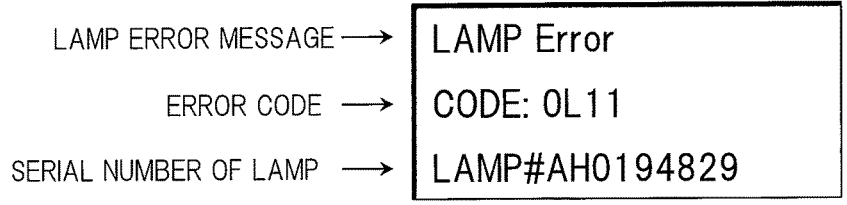
Figure 8:
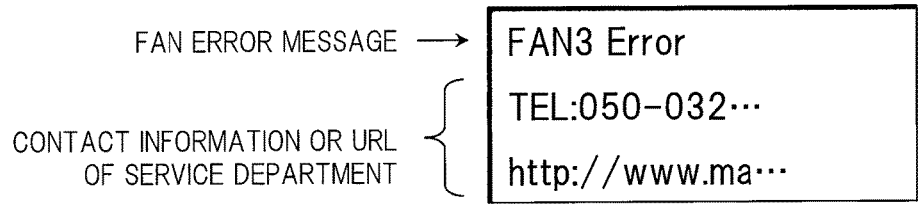
Figure 8:
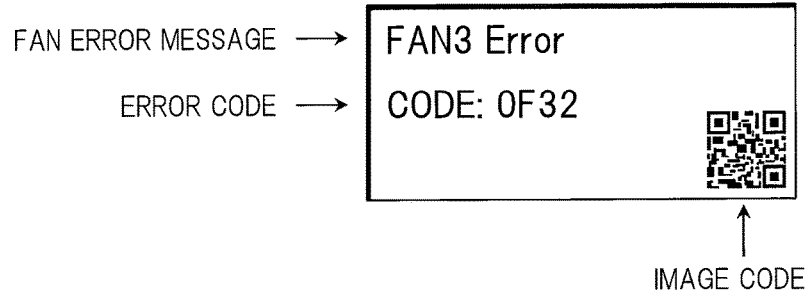
Figure 9:
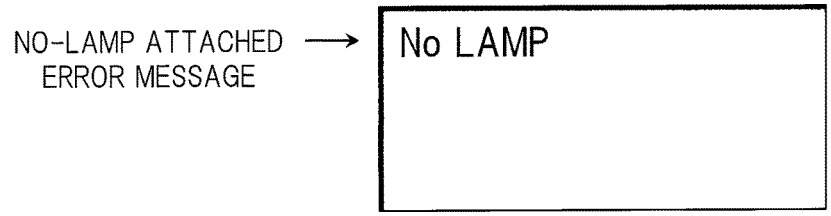
Figure 9:
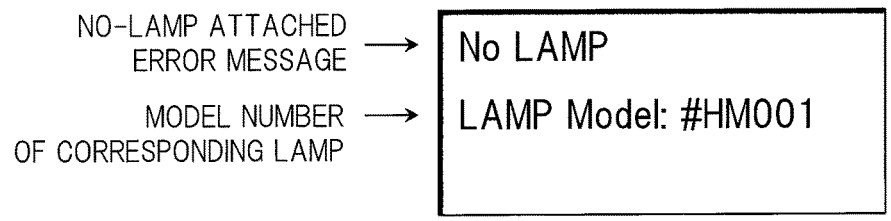
Figure 9:
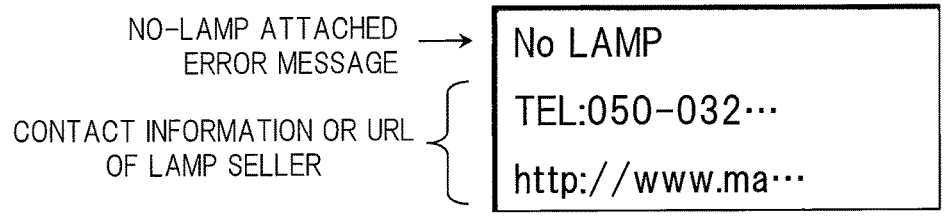

FIG. 8 and FIG. 9 are diagrams illustrating an outline about an example of an error display. The error display is a display notifying the user that an error(s) is occurring. FIG. 8(*a*) illustrates an example of displaying a serial number of the main body of the projection type image display apparatus 1 in addition to the display of a fan error message and its error code indicating that an error(s) is occurring in the cooling fan 19. Similarly, FIG. 8(*b*) illustrates an example of displaying a serial number of the light source 13 (lamp) in addition to the display of an error message and its error code indicating that an error(s) is occurring in the light source 13 (lamp). This similarly applies to errors generated in other sites and components.

A content of the error display may be maintained, as it is, by the function of the nonvolatile display device 17 even in a case where the power supply is stopped due to disconnection of the power supply line 26. This makes it possible for the user to notify the content of the error in contacting a service department or the like of the manufacturer without reconnecting the power supply line 26. Moreover, even when the projection type image display apparatus 1 is sent for repair to a dealer or a service department etc. of a manufacturer, the person in charge, or the like is capable of grasping the content of the error without connecting the power supply line 26, thereby being able to enhance work efficiency.

FIG. 8(*c*) illustrates an example of displaying contact information or a uniform resource locator (URL) of a seller or a service department or manufacturer in addition to the display of the fan error message. In this manner, for example, by displaying information on a telephone number of the service department and the URL of a homepage where the information on a product manual and contact information etc. exists, the efficiency when the user accesses the service department can be significantly improved.

FIG. 8(*d*) illustrates an example of displaying an image code storing information on the URL etc. of the above-described homepage in addition to the display of the fan error message and its error code. Known two-dimensional bar codes such as QR codes (registered trademark) can be used as the image codes. Thus, the user can efficiently obtain information related to the error by using a portable information terminal such as a smartphone or a tablet terminal with a camera capable of reading the image code.

FIG. 9(a) illustrates an example of displaying only a no-lamp attached error message indicating that the lamp is not attached to the light source 13. FIG. 9(b) illustrates an example of displaying information on a model number of a corresponding attachable lamp in addition to the display of the no-lamp attached error message. Moreover, FIG. 9(c) illustrates an example of displaying contact information or URL about a lamp seller or the like in addition to display of the no-lamp attached error message. The information on the contact information and URL may be the same as the information on the contact information and URL of the service department illustrated in FIG. 8(c).

Incidentally, a display method illustrated in each of the above drawings is an example, and items on the display, order of the display, the number of lines on the display, and the like in each of the drawing are not limited to those illustrated in the drawings. The items on the display in the respective drawings may be displayed in combination with other items. Moreover, for example, a display pattern may be switched at any time on the basis of an instruction(s) from the user via the operation input unit 23.

Figure 10:
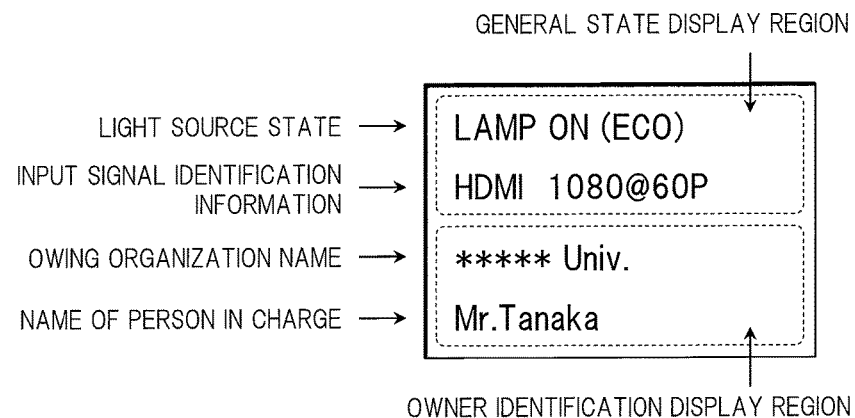
Figure 10:
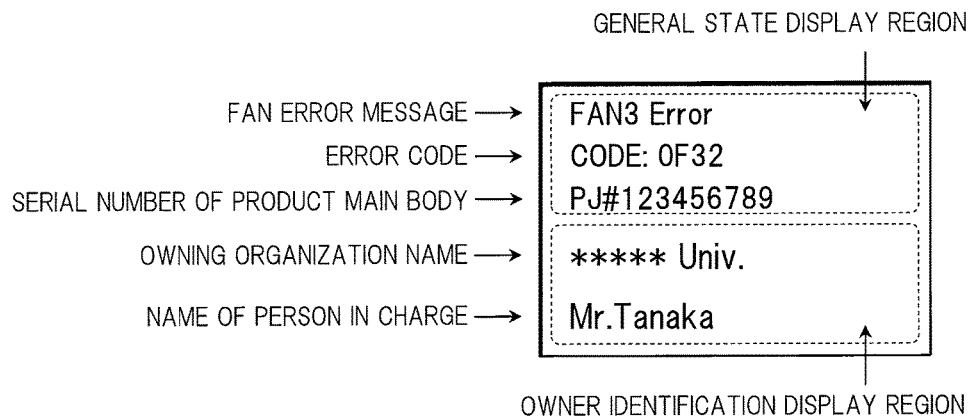

Hereinafter, described will be a case where a display region of the nonvolatile display device 17 is divided into a plurality of regions and the pieces of information illustrated in FIGS. 3 to 9 are displayed in combination with each other in each of the regions. FIG. 10 is a diagram illustrating an outline about an example of displaying information in each of two regions of a general state display region and an owner identification display region. In the example of FIG. 10, the owner identification display illustrated in FIG. 3 is fixedly displayed in the lower owner identification display region, and information is displayed in the upper general state display region in accordance with the state of the projection type image display apparatus 1. FIG. 10(a) illustrates an example of displaying the operation state display illustrated in FIG. 4 in the general state display region, and FIG. 10(b) illustrates an example of displaying the error displays illustrated in FIGS. 8 and 9 in the general state display region.

Figure 11:
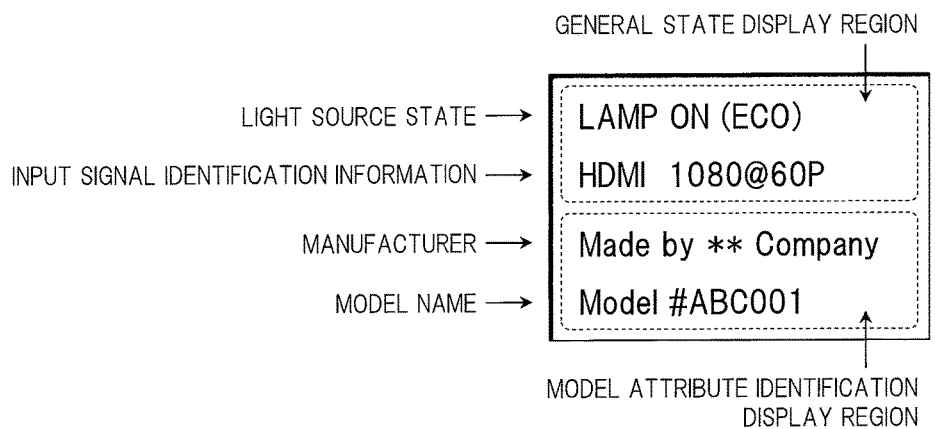
Figure 11:
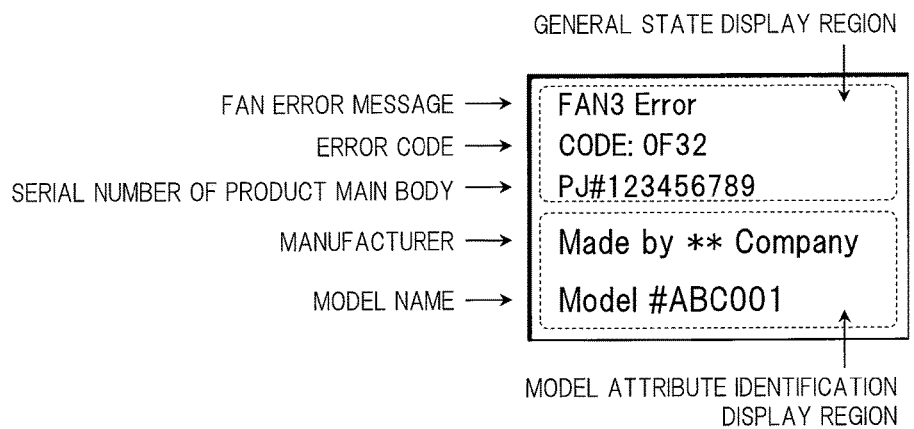

Similarly, FIG. 11 is a diagram illustrating an outline about an example of displaying information in each of two regions of the general state display region and the model attribute identification display. Unlike the example of FIG. 10, the example of FIG. 11 fixedly displays the model attribute identification display illustrated in FIG. 7 in the lower model attribute identification display region.

Figure 12:
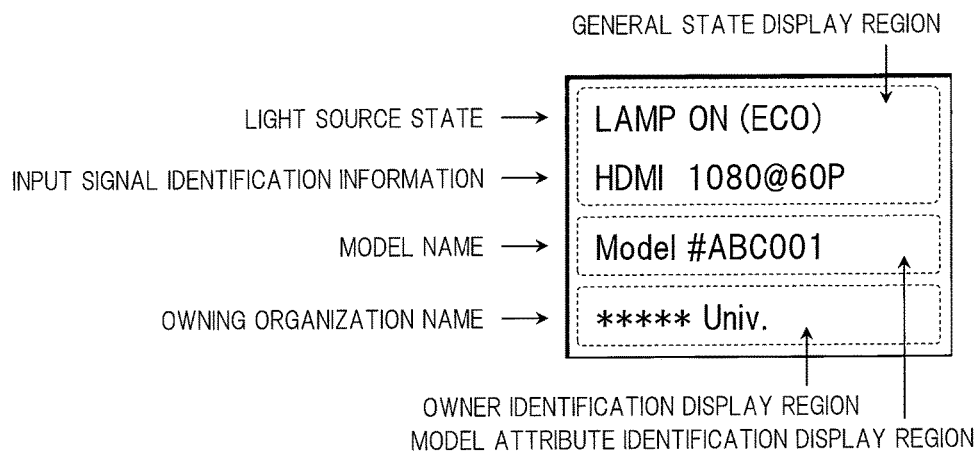
Figure 12:
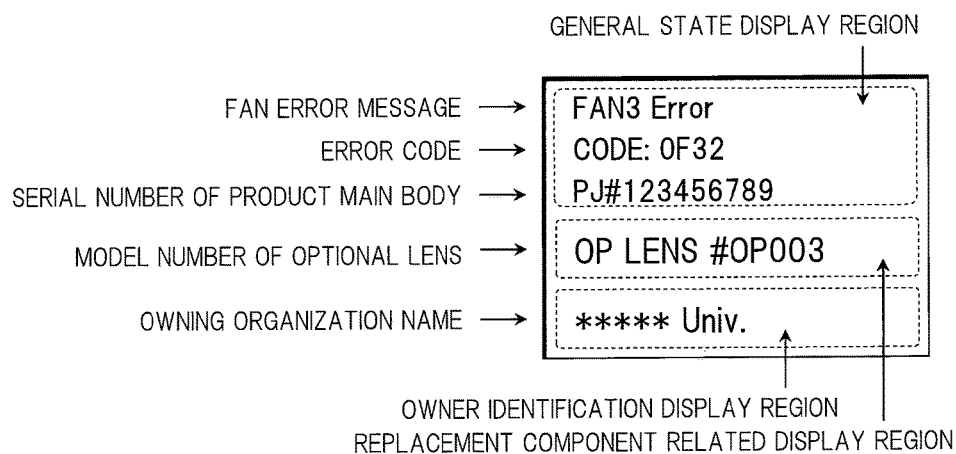

FIG. 12 is a diagram illustrating an outline about an example of displaying information in each of three regions. FIG. 12(a) illustrates an example of: fixedly displaying the model attribute identification display illustrated in FIG. 7 in the middle model attribute identification display region; fixedly displaying the owner identification display illustrated in FIG. 3 in the lower owner identification display region; and displaying the operation state display illustrated in FIG. 4 in the upper general state display region. Moreover, unlike FIG. 12(a), FIG. 12(b) illustrates an example of: fixedly displaying the replacement component related display illustrated in FIG. 6 in the middle replacement component related display region; displaying the error displays illustrated in FIGS. 8 and 9 in the upper general state display region.

Incidentally, the display method illustrated in each of FIGS. 10 to 12 is also an example, and items on the display, order of the display, and the number of lines on the display, etc. in each of the drawing are not limited to those illustrated in the drawings. The number of regions and the method of division are not limited to those illustrated either. Moreover, for example, the display pattern may be switchable at any time on the basis of an instruction(s) from the user via the operation input unit 23.

<Example of Screen Transition of Subdisplay (Nonvolatile Display Device 17)>

FIGS. 13 to 15 are diagrams each illustrating an outline about an example of a transition of a screen display content of the nonvolatile display device 17 under the control of the processing unit 18. FIG. 13 is a diagram illustrating an outline about an example of a transition of a normal screen display content. First, when the power supply is first turned on from a shipment display (S01) state as an initial state, that is, when the power supply line 26 is connected with the external power supply 3, the state transitions to a standby display (before setting) (S02) state. Here, "before setting" refers to a state in which setting processings to various types of information by the user via the setting menu have not been performed. Therefore, this state also applies to a second-time or subsequent standby display before the setting processing as well as a time when first-time power supply is turned on immediately after shipment. Incidentally, an example of a concrete display content in each state will be described below.

When the light source 13 is turned on in the standby display (before setting) (S02) state and image projection is started, the state transitions to alight source turning-on display (S03) state. From this state, when the user performs the setting processing via the setting menu and the light source 13 is then turned off to finish the image projection, the state transitions to a state of a light source post-turning-off during-cooling display (S04). Then, when the cooling is finished, the state transitions to a state of a standby display (after setting) (S05). The state transitions directly to the standby display (after setting) (S05) state without indicating the light source post-turning-off during-cooling display (S04) in a case where the light source 13 is turned off from the light source turning-on display (S03) state. When the light source 13 is turned on again in the standby display (after setting) (S05) state, the state returns to the light source turned-on display (S03) state.

In contrast, when the power supply is turned off by an ordinary procedure in the standby display (before setting) (S02) state or the standby display (after setting) (S05) state, that is, when the power supply line 26 is disconnected, the state transitions to a state of a from-standby power supply turning-off display (S06). In the present embodiment, by the function of the nonvolatile display device 17, a display of predetermined information can be maintained even in a state without the power supply.

FIG. 14 is a diagram illustrating an outline about an example of a transition of a screen display content in a case where power supply is forcibly turned off from a state other than standby. Since the screen transitions in S01 to S06 of FIG. 14 are similar to ordinary screen transitions in the above-described FIG. 13, the description thereof will be omitted. When the projection type image display apparatus 1 is in operation other than standby operation, that is, the power supply is forcibly turned off in the light source turning-on display (S03) state or the light source post-turning-off during-cooling display (S04) state, in other words, when the power supply line 26 is disconnected, the state transitions to a state of a from-other-than-standby power supply forcibly turning-off display (S07). Even in this case, due to the function of the nonvolatile display device 17, it is possible to maintain the display of predetermined information even in the state of having no power supply.

FIG. 15 is a diagram illustrating an outline about an example of a transition of a screen display content in a case where an error is detected. Since the screen transitions in S01 to S06 of FIG. 5 are similar to ordinary screen transitions in the above-described FIG. 13, the description thereof will be omitted. When the processing unit 18 detects an error(s) in a state where power is provided to the projection type image display apparatus 1, that is, in each of states of the standby display (before setting) (S02) to the standby display (after setting) (S05), the state transitions to a state of an error display (S08). Incidentally, the state of the light source turning-on display (S03) transitions to the state of the error display (S08) when the light source 13 is turned off in addition to the error detection.

When the power supply is turned off by an ordinary procedure in the state of the error display (S08), that is, when the power supply line 26 is disconnected, the state transitions to a state of a from-error power supply turning-off display (S09). Even in this case, due to the function of the nonvolatile display device 17, it is possible to maintain the display of predetermined information even in the state of having no power supply.

Examples of the specific display contents in the respective states of the screen transitions illustrated in the examples of FIGS. 13 to 15 are illustrated in the following table.

Basically, the shipment display (S01) in any of the above patterns indicates no display or arbitrary information previously set as other display. Alternatively, the model attribute identification display illustrated in FIG. 7 may be indicated at a time of shipment. The standby display (before setting) (S02) may be also set so as to indicate no display or other display.

Alternatively, the model attribute identification display illustrated in FIG. 7 may be indicated at the time of shipment. The display content of the shipment display (S01) may be maintained as it is or the display may be switched. For example, the shipment display (S01) indicates no display, but the shipment display may be switched to the model attribute identification display in the standby display (before setting) (S02) accompanying the turning-on of the power supply.

The light source turning-on display (S03) is set to indicate the operation state display illustrated in FIG. 4, and the light source post-turning-off during-cooling display (S04) is set to indicate the during-cooling display illustrated in FIG. 5. Moreover, the standby display (after setting) (S06) is set to indicate the owner identification display illustrated in FIG. 3 in the case of "display switching example 1-1", and set to indicate the replacement component related display illustrated in FIG. 6 in the case of "display switching example

TABLE 1

| | STATUS | DISPLAY SWITCHING EXAMPLE 1-1 MAINTAIN OWNER IDENTIFICATION DISPLAY ALSO AFTER TURNING OFF POWER PROVISION | DISPLAY SWITCHING EXAMPLE 1-2 MAINTAIN REPLACEMENT COMPONENT RELATED DISPLAY ALSO AFTER TURNING OFF POWER PROVISION |
|---|---|---|---|
| S01 | SHIPMENT DISPLAY | NO DISPLAY OR OTHER DISPLAY | NO DISPLAY OR OTHER DISPLAY |
| S02 | STANDBY DISPLAY (BEFORE SETTING) | NO DISPLAY OR OTHER DISPLAY | NO DISPLAY OR OTHER DISPLAY |
| S03 | LIGHT SOURCE TURNING-ON DISPLAY | OPERATION STATE DISPLAY | OPERATION STATE DISPLAY |
| S04 | LIGHT SOURCE POST-TURNING-OFF DURING-COOLING DISPLAY | DURING-COOLING DISPLAY | DURING-COOLING DISPLAY |
| S05 | STANDBY DISPLAY (AFTER SETTING) | OWNER IDENTIFICATION DISPLAY | REPLACEMENT COMPONENT RELATED DISPLAY |
| S06 | FROM-STANDBY POWER PROVISION TURNING-OFF DISPLAY | MAINTAIN STANDBY DISPLAY | MAINTAIN STANDBY DISPLAY |
| S07 | FROM-OTHER-THAN-STANDBY POWER PROVISION FORCIBLY TURNING-OFF STATE | MAINTAIN DISPLAY AT TIME OF TURNING OFF POWER PROVISION | MAINTAIN DISPLAY AT TIME OF TURNING OFF POWER PROVISION |
| S08 | ERROR DISPLAY | ERROR DISPLAY | ERROR DISPLAY |
| S09 | FROM-ERROR POWER PROVISION TURNING-OFF DISPLAY | MAINTAIN ERROR DISPLAY | MAINTAIN ERROR DISPLAY |

As illustrated in FIGS. 3 to 9 described above, Table 1 illustrates two patterns "display switching example 1-1" and "display switching example 1-2" as examples of display contents in a screen transition in a case where various types of information are displayed by defining the entire display region of the nonvolatile display device 17 as one region. "Display switching example 1-1" is a pattern of maintaining the owner identification display illustrated in FIG. 3 even after the power supply is turned off. "Display switching example 1-2" is a pattern of maintaining the replacement component related display illustrated in FIG. 6 even after the power supply is turned off.

1-2". Incidentally, the owner identification display and the replacement component related display are to be indicated only when turning-on of the display is specified by the user via the setting menu described below, and further the owner identification display is to be indicated only when the owner information has been registered by the user.

In the case of the from-standby power supply turning-off display (S06) also in any of the patterns, the display content in the standby display (S02 or S05) is to be maintained as it is even when the power supply is turned off. Similarly, in the from-other-than-standby power supply forcibly turning-off display (S07), the display content at a time point when the power supply is turned off is to be maintained as it is. Moreover, the error display (S08) is set to indicate the error displays illustrated in FIGS. 8 and 9. In the case of the from-error power supply turning-off display (S09), the display content at the time of the error display (S08) is maintained even when the power supply is turned off.

Next, as illustrated in FIGS. 10 and 11 described above, the following table illustrates an example of a display content in a screen transition in a case of dividing the display region of the nonvolatile display device 17 into two regions and displaying information in each of the regions.

taining the replacement component related display even after the power source supply is turned off. Moreover, "display switching example 2-3" is a pattern of: fixedly and always indicating the model attribute identification display illustrated in FIG. 7; and maintaining the model attribute identification display even after the power source supply is turned off.

In the shipment display (S01) and the standby display (before setting) (S02) in any of the patterns, either of display regions #1 and #2 basically indicates no display or other display similarly to the case of Table 1. For example, display

TABLE 2

| STATUS | | DISPLAY REGION | DISPLAY SWITCHING EXAMPLE 2-1 ALWAYS INDICATE OWNER IDENTIFICATION DISPLAY | DISPLAY SWITCHING EXAMPLE 2-2 ALWAYS INDICATE REPLACEMENT COMPONENT RELATED DISPLAY | DISPLAY SWITCHING EXAMPLE 2-3 ALWAYS INDICATE MODEL ATTRIBUTE IDENTIFICATION DISPLAY |
|---|---|---|---|---|---|
| S01 | SHIPMENT DISPLAY | #1 | NO DISPLAY OR OTHER DISPLAY | NO DISPLAY OR OTHER DISPLAY | NO DISPLAY OR OTHER DISPLAY |
| | | #2 | NO DISPLAY OR OTHER DISPLAY | NO DISPLAY OR OTHER DISPLAY | MODEL ATTRIBUTE IDENTIFICATION DISPLAY |
| S02 | STANDBY DISPLAY (BEFORE SETTING) | #1 | NO DISPLAY OR OTHER DISPLAY | NO DISPLAY OR OTHER DISPLAY | NO DISPLAY OR OTHER DISPLAY |
| | | #2 | NO DISPLAY OR OTHER DISPLAY | NO DISPLAY OR OTHER DISPLAY | MODEL ATTRIBUTE IDENTIFICATION DISPLAY |
| S03 | LIGHT SOURCE TURNING-ON DISPLAY | #1 | OPERATION STATE DISPLAY | OPERATION STATE DISPLAY | OPERATION STATE DISPLAY |
| | | #2 | OWNER IDENTIFICATION DISPLAY | REPLACEMENT COMPONENT RELATED DISPLAY | MODEL ATTRIBUTE IDENTIFICATION DISPLAY |
| S04 | LIGHT SOURCE POST-TURNING-OFF | #1 | DURING-COOLING DISPLAY | DURING-COOLING DISPLAY | DURING-COOLING DISPLAY |
| | | #2 | OWNER IDENTIFICATION DISPLAY | REPLACEMENT COMPONENT RELATED DISPLAY | MODEL ATTRIBUTE IDENTIFICATION DISPLAY |
| S05 | STANDBY DISPLAY (AFTER SETTING) | #1 | INDICATE NO DISPLAY OR DISPLAY OTHER THAN OWNER IDENTIFICATION DISPLAY | INDICATE NO DISPLAY OR DISPLAY OTHER THAN REPLACEMENT COMPONENT RELATED DISPLAY | INDICATE NO DISPLAY OR DISPLAY OTHER THAN MODEL ATTRIBUTE IDENTIFICATION DISPLAY |
| | | #2 | OWNER IDENTIFICATION DISPLAY | REPLACEMENT COMPONENT RELATED DISPLAY | MODEL ATTRIBUTE IDENTIFICATION DISPLAY |
| S06 | FROM-STANDBY POWER PROVISION TURNING-OFF DISPLAY | #1 | MAINTAIN STANDBY DISPLAY | MAINTAIN STANDBY DISPLAY | MAINTAIN STANDBY DISPLAY |
| | | #2 | MAINTAIN OWNER IDENTFICATION DISPLAY | MAINTAIN REPLACEMENT COMPONENT RELATED DISPLAY | MAINTAIN MODEL ATTRIBUTE IDENTIFICATION DISPLAY |
| S07 | FROM-OTHER-THAN-STANDBY POWER PROVISION FORCIBLY TURNING-OFF STATE | #1 | MAINTAIN DISPLAY AT TIME OF TURNING OFF POWER PROVISION | MAINTAIN DISPLAY AT TIME OF TURNING OFF POWER PROVISION | MAINTAIN DISPLAY AT TIME OF TURNING OFF POWER PROVISION |
| | | #2 | MAINTAIN OWNER IDENTFICATION DISPLAY | MAINTAIN REPLACEMENT COMPONENT RELATED DISPLAY | MAINTAIN MODEL ATTRIBUTE IDENTIFICATION DISPLAY |
| S08 | ERROR DISPLAY | #1 | ERROR DISPLAY | ERROR DISPLAY | ERROR DISPLAY |
| | | #2 | OWNER IDENTIFICATION DISPLAY | REPLACEMENT COMPONENT RELATED DISPLAY | MODEL ATTRIBUTE IDENTIFICATION DISPLAY |
| S09 | FROM-ERROR POWER PROVISION TURNING-OFF DISPLAY | #1 | MAINTAIN ERROR DISPLAY | MAINTAIN ERROR DISPLAY | MAINTAIN ERROR DISPLAY |
| | | #2 | MAINTAIN OWNER IDENTIFICATION DISPLAY | MAINTAIN REPLACEMENT COMPONENT RELATED DISPLAY | MAINTAIN MODEL ATTRIBUTE IDENTIFICATION DISPLAY |

Table 2 illustrates, as an example of a display content, content to be displayed in each of display region 1 (e.g., upper regions in FIGS. 10 and 11), and display region 2 (e.g., lower regions to be fixedly displayed in FIGS. 10 and 11) about three patterns of "display switching example 2-1", "display switching example 2-2", and "display switching example 2-3".

"Display switching example 2-1" in the table is a pattern of: fixedly and always indicating the owner identification display illustrated in FIG. 3; and maintaining the owner identification display even after the power source supply is turned off. Similarly, "display switching example 2-2" is a pattern of: fixedly and always indicating the replacement component related display illustrated in FIG. 6; and main-region #1 may be set to the model attribute identification display illustrated in FIG. 7 at the time of shipping. In the case of "display switching example 2-3", however, display region #2 is set to the model attribute identification display. In the standby display (before setting) (S02), the display content of the shipment display (S01) may be maintained as it is or the display may be switched.

Moreover, the light source turning-on display (S03) in any of the patterns sets display region #1 to the operation state display illustrated in FIG. 4, and the light source post-turning-off during-cooling display (S04) sets display region #1 to the during-cooling display illustrated in FIG. 5. In contrast, display region #2 corresponds to each of the patterns, specifically indicates the owner identification display illustrated in FIG. 3 in the case of "display switching example 2-1", the replacement component related display illustrated in FIG. 6 in the case of "display switching example 2-2", and the model attribute identification display illustrated in FIG. 7 in the case of "display switching example 2-3". Incidentally, similarly to the case of Table 1 described above, the owner identification display and the replacement component related display are to be indicated only when the turning-on of the display is specified by the user via the setting menu described below, and further the owner identification display is to be indicated only when the owner information has been registered by the user.

In addition, in the standby display (after setting) (S05), display region #1 corresponds to each of the patterns, specifically indicates no display or a display(s) other than the owner identification display in the case of "display switching example 2-1", indicates no display or a display (s) other than the replacement component related display in the case of "display switching example 2-2", and indicates no display or a display(s) other than the model attribute identification display in the case of "display switching example 2-3". In contrast, display region #2 is similar to the case of the above-described light source post-turning-off during-cooling display (S04).

In the case of the from-standby power supply turning-off display (S06) in any of the patterns, display region #1 maintains the display content at the standby display (S02 or S05) as it is even when the power supply is turned off. Similarly, in the from-other-than-standby power supply forcibly turning-off display (S07), display region #1 maintains the display content, as it is, at the time when the power supply is turned off. Moreover, in the error display (S08), display region #1 indicates the error display each illustrated in FIGS. 8 and 9. Moreover, in the from-error power supply turning-off display (S09), display region #1 maintains the display content at the error display (S08) even when the power supply is turned off.

In contrast, for each display of the from-standby power supply turning-off display (S06) to the from-error power supply turning-off display (S09), display region #2 corresponds to each of the patterns, specifically maintains or indicates: the owner identification display illustrated in FIG. 3 in the case of "display switching example 2-1"; the replacement component related display illustrated in FIG. 6 in the case of "display switching example 2-2"; and the model attribute identification display illustrated in FIG. 7 in the case of "display switching example 2-3".

Next, as illustrated in FIG. 12 described above, the following table illustrates an example of a display content in the screen transition in the case of dividing the display region of the nonvolatile display device 17 into three regions and displaying information in each of the regions.

TABLE 3

| | STATUS | DISPLAY REGION | DISPLAY SWITCHING EXAMPLE 2-1 ALWAYS INDICATE OWNER IDENTIFICATION DISPLAY AND REPLACEMENT COMPONENT RELATED DISPLAY | DISPLAY SWITCHING EXAMPLE 2-2 ALWAYS INDICATE MODEL ATTRIBUTE IDENTIFICATION DISPLAY AND REPLACEMENT COMPONENT RELATED DISPLAY |
|---|---|---|---|---|
| S01 | SHIPMENT DISPLAY | #1 | NO DISPLAY OR OTHER DISPLAY | NO DISPLAY OR OTHER DISPLAY |
| | | #2 | NO DISPLAY OR OTHER DISPLAY | NO DISPLAY OR OTHER DISPLAY |
| | | #3 | NO DISPLAY OR OTHER DISPLAY | MODEL ATTRIBUTE IDENTIFICATION DISPLAY |
| S02 | STANDBY DISPLAY (BEFORE SETTING) | #1 | NO DISPLAY OR OTHER DISPLAY | NO DISPLAY OR OTHER DISPLAY |
| | | #2 | NO DISPLAY OR OTHER DISPLAY | NO DISPLAY OR OTHER DISPLAY |
| | | #3 | NO DISPLAY OR OTHER DISPLAY | MODEL ATTRIBUTE IDENTIFICATION DISPLAY |
| S03 | LIGHT SOURCE TURNING-ON DISPLAY | #1 | OPERATION STATE DISPLAY | OPERATION STATE DISPLAY |
| | | #2 | OWNER IDENTIFICATION DISPLAY | REPLACEMENT COMPONENT RELATED DISPLAY |
| | | #3 | REPLACEMENT COMPONENT RELATED DISPLAY | MODEL ATTRIBUTE IDENTIFICATION DISPLAY |
| S04 | LIGHT SOURCE POST-TURNING-OFF DURING-COOLING DISPLAY | #1 | DURING-COOLING DISPLAY | DURING-COOLING DISPLAY |
| | | #2 | OWNER IDENTIFICATION DISPLAY | REPLACEMENT COMPONENT RELATED DISPLAY |
| | | #3 | REPLACEMENT COMPONENT RELATED DISPLAY | MODEL ATTRIBUTE IDENTIFICATION DISPLAY |
| S05 | STANDBY DISPLAY (AFTER SETTING) | #1 | INDICATE NO DISPLAY OR DISPLAY OTHER THAN OWNER IDENTIFICATION DISPLAY AND REPLACEMENT COMPONENT RELATED DISPLAY | INDICATE NO DISPLAY OR DISPLAY OTHER THAN MODEL ATTRIBUTE IDENTIFICATION DISPLAY AND REPLACEMENT COMPONENT RELATED DISPLAY |
| | | #2 | OWNER IDENTIFICATION DISPLAY | REPLACEMENT COMPONENT RELATED DISPLAY |
| | | #3 | REPLACEMENT COMPONENT RELATED DISPLAY | MODEL ATTRIBUTE IDENTIFICATION DISPLAY |
| S06 | FROM-STANDBY POWER PROVISION TURNING-OFF DISPLAY | #1 | MAINTAIN STANDBY DISPLAY | MAINTAIN STANDBY DISPLAY |
| | | #2 | MAINTAIN OWNER IDENTIFICATION DISPLAY | MAINTAIN REPLACEMENT COMPONENT RELATED DISPLAY |
| | | #3 | MAINTAIN REPLACEMENT COMPONENT RELATED DISPLAY | MAINTAIN MODEL ATTRIBUTE IDENTIFICATION DISPLAY |
| S07 | FROM-OTHER-THAN-STANDBY POWER PROVISION FORCIBLY TURNING-OFF STATE | #1 | MAINTAIN DISPLAY AT TIME OF TURNING OFF POWER PROVISION | MAINTAIN DISPLAY AT TIME OF TURNING OFF POWER PROVISION |
| | | #2 | MAINTAIN OWNER IDENTIFICATION DISPLAY | MAINTAIN REPLACEMENT COMPONENT RELATED DISPLAY |
| | | #3 | MAINTAIN REPLACEMENT COMPONENT RELATED DISPLAY | MAINTAIN MODEL ATTRIBUTE IDENTIFICATION DISPLAY |

TABLE 3-continued

| Status | | | Display Region | Display Switching Example 2-2 Always Indicate Model Attribute Identification Display and Replacement Component Related Display |
|---|---|---|---|---|
| S08 | ERROR DISPLAY | | #1 | ERROR DISPLAY |
| | | | #2 | REPLACEMENT COMPONENT RELATED DISPLAY |
| | | | #3 | MODEL ATTRIBUTE IDENTIFICATION DISPLAY |
| S09 | FROM-ERROR POWER PROVISION TURNING-OFF DISPLAY | | #1 | MAINTAIN ERROR DISPLAY |
| | | | #2 | MAINTAIN REPLACEMENT COMPONENT RELATED DISPLAY |
| | | | #3 | MAINTAIN MODEL ATTRIBUTE IDENTIFICATION DISPLAY |

| Status | | | Display Region | Display Switching Example 2-3 Always Indicate Model Attribute Identification Display and Owner Identification Display |
|---|---|---|---|---|
| S01 | SHIPMENT DISPLAY | | #1 | NO DISPLAY OR OTHER DISPLAY |
| | | | #2 | NO DISPLAY OR OTHER DISPLAY |
| | | | #3 | MODEL ATTRIBUTE IDENTIFICATION DISPLAY |
| S02 | STANDBY DISPLAY (BEFORE SETTING) | | #1 | NO DISPLAY OR OTHER DISPLAY |
| | | | #2 | NO DISPLAY OR OTHER DISPLAY |
| | | | #3 | MODEL ATTRIBUTE IDENTIFICATION DISPLAY |
| S03 | LIGHT SOURCE TURNING-ON DISPLAY | | #1 | OPERATION STATE DISPLAY |
| | | | #2 | OWNER IDENTIFICATION DISPLAY |
| | | | #3 | MODEL ATTRIBUTE IDENTIFICATION DISPLAY |
| S04 | LIGHT SOURCE POST-TURNING-OFF DURING-COOLING DISPLAY | | #1 | DURING-COOLING DISPLAY |
| | | | #2 | OWNER IDENTIFICATION DISPLAY |
| | | | #3 | MODEL ATTRIBUTE IDENTIFICATION DISPLAY |
| S05 | STANDBY DISPLAY (AFTER SETTING) | | #1 | INDICATE NO DISPLAY OR DISPLAY OTHER THAN MODEL ATTRIBUTE IDENTIFICATION DISPLAY AND OWNER IDENTIFICATION DISPLAY |
| | | | #2 | OWNER IDENTIFICATION DISPLAY |
| | | | #3 | MODEL ATTRIBUTE IDENTIFICATION DISPLAY |
| S06 | FROM-STANDBY POWER PROVISION TURNING-OFF DISPLAY | | #1 | MAINTAIN STANDBY DISPLAY |
| | | | #2 | MAINTAIN OWNER IDENTIFICATION DISPLAY |
| | | | #3 | MAINTAIN MODEL ATTRIBUTE IDENTIFICATION DISPLAY |
| S07 | FROM-OTHER-THAN-STANDBY POWER PROVISION FORCIBLY TURNING-OFF STATE | | #1 | MAINTAIN DISPLAY AT TIME OF TURNING OFF POWER PROVISION |
| | | | #2 | MAINTAIN OWNER IDENTIFICATION DISPLAY |
| | | | #3 | MAINTAIN MODEL ATTRIBUTE IDENTIFICATION DISPLAY |
| S08 | ERROR DISPLAY | | #1 | ERROR DISPLAY |
| | | | #2 | OWNER IDENTIFICATION DISPLAY |
| | | | #3 | MODEL ATTRIBUTE IDENTIFICATION DISPLAY |
| S09 | FROM-ERROR POWER PROVISION TURNING-OFF DISPLAY | | #1 | MAINTAIN ERROR DISPLAY |
| | | | #2 | MAINTAIN OWNER IDENTIFICATION DISPLAY |
| | | | #3 | MAINTAIN MODEL ATTRIBUTE IDENTIFICATION DISPLAY |

Table 3 illustrates, as an example of display content, a content to be displayed in each of display region 1 (e.g., upper regions in FIG. 12), display region 2 (e.g., middle regions to be fixedly displayed in FIG. 12), and display region 3 (e.g., lower regions to be fixedly displayed in FIG. 12) about three patterns of "display switching example 3-1", "display switching example 3-2", and "display switching example 3-3".

"Display switching example 3-1" in the table is a pattern of: fixedly and always indicating the owner identification display illustrated in FIG. 3 and the replacement component related display illustrated in FIG. 6; and maintaining those displays even after the power supply is turned off. Similarly, "display switching example 3-2" is a pattern of: fixedly and always indicating the model attribute identification display illustrated in FIG. 7 and the replacement component related display; and maintaining those displays even after the power source supply is turned off. Moreover, "display switching example 3-3" is a pattern of: fixedly and always indicating the model attribute identification display and the owner identification display; and maintaining those displays even after the power source supply is turned off.

In the shipment display (S01) and the standby display (before setting) (S02), each of display regions #1, #2, and #3 in any of the patterns basically indicates no display or other display similarly to the case of Table 1. However, for example, display region #1 may be set to the model attribute identification display illustrated in FIG. 7 at the time of shipment in the case of "display switching example 3-1". Moreover, in the cases of "display switching example 3-2" and "display switching example 3-3", display region #3 is set to the model attribute identification display. In the standby display (before setting) (S02), the display content of the shipment display (S01) may be maintained as it is, or the display may be switched.

Moreover, in any of the patterns, display region #1 is set to the operation state display illustrated in FIG. 4 in the light source turning-on display (S03); display region #1 is set to the during-cooling display illustrated in FIG. 5 in the light source post-turning-off during-cooling display (S04); and, at the same time, display regions #2 and #3 are set corresponding to each of the patterns, specifically, display region #2 is set to the owner identification display illustrated in FIG. 3 and display region #3 is set to the replacement component related display illustrated in FIG. 6 in the case of "display switching example 3-1". In the case of "display switching example 3-2", display region #2 is set to the replacement component related display, and display region #3 is set to the model attribute identification display illustrated in FIG. 7. In the case of "display switching example 3-3", display region #2 is set to the owner identification display, and display region #3 is set to the model attribute identification display.

Incidentally, similarly to the case of Table 1 described above, the owner identification display and the replacement component related display are to be indicated only when the turning-on of the display is specified by the user via the setting menu described below. Further the owner identification display is to be indicated only when the owner information has been registered by the user.

In addition, in the standby display (after setting) (S05), display region #1 corresponds to each of the patterns, specifically indicates no display or a display(s) other than the replacement component related display in the case of "display switching example 3-1", indicates no display or a display(s) other than the model attribute identification display and the replacement component related display in the case of "display switching example 3-2", and indicates no display or a display(s) other than the model attribute identification display and the owner identification display in the case of "display switching example 3-3". Display regions #2 and #3 are similar to the case of the light source post-turning-off during-cooling display (S04) described above.

In the case of the from-standby power supply turning-off display (S06) in any of the patterns, display region #1 maintains, as it is, the display content at the standby display (S02 or S05) even when the power supply is turned off. Similarly, in the from-other-than-standby power supply forcibly turning-off display (S07), display region #1 maintains, as it is, the display content at a time point when the power supply is turned off. Moreover, in the error display (S08), display region #1 indicates the error display each illustrated in FIGS. 8 and 9. Moreover, in the from-error power supply turning-off display (S09), display region #1 maintains the display content at the time of the error display (S08) even when the power supply is turned off.

In contrast, display regions #2 and #3 correspond to each of the patterns about each of the displays of the from-standby power supply turning-off display (S06) to the from-error power supply turning-off display (S09), specifically maintain or indicate: the owner identification display illustrated in FIG. 3 or the replacement component related display illustrated in FIG. 6 in the case of "display switching example 3-1"; the replacement component related display or the model attribute identification display illustrated in FIG. 7 in the case of "display switching example 3-2"; and the owner identification display or the model attribute identification display in the case of "display switching example 3-3".

<Setting Menu Screen>

FIGS. 16 to 19 are diagrams each illustrating an outline about an example of a setting menu screen for setting a display content or the like of the nonvolatile display device 17. For example, the setting menu screen 50 is projected as a projection image 41 on the screen 4 by an instruction from the user via the operation input unit 23, and receives registration of a value(s) and a setting content(s) by a user's operation via the operation input unit 23.

In an example of FIG. 16, an owner information registration menu 52 on a left side of the screen is provided with an "owner information registration" field and a "user-specified sentence registration" field. The example illustrates a case where an input cursor 51 focuses on the "owner information registration" field, and indicates that its input is currently being received. In this menu, in addition to registration and change of owner information including items such as "organization name", "name of person in charge", "contact information", it is possible to receive registration of any sentence as a "user-specified sentence". As an example of the user-specified sentence, for, example, it is possible to set cautions etc. to the user together with information for identifying the owner. For example, this user-specified sentence may be displayed as a custom display mode in place of the display content in the owner identification display illustrated in FIG. 3, or may be displayed together with the owner information.

Meanwhile, a right side portion of the screen in FIG. 16 is provided with an owner identification display setting menu 53, a replacement component related display setting menu 54, and a model attribute identification display setting menu 55, and the user can set turning-on/off of the display of each item on the nonvolatile display device 17.

Incidentally, the items of attribute information of the projection type image display apparatus 1 such as a model name and performance in the model attribute identification display can be set only regarding the turning-on/off of the display in the model attribute identification display setting menu 55, so that the user cannot rewrite contents of the above items. This makes it possible to suppress such illegal resale or the like as to improperly alter attribute information on a model name and performance, etc. Alternatively, in the case of updating the owner information or the user-specified sentence in the owner identification display setting menu 53, illegal rewriting may be suppressed by requiring an input of a password(s) as illustrated in the example of FIG. 17.

Moreover, there is no need to register the above-described user-specified sentence as the owner information. As illustrated in the example of FIG. 18, the user-specified sentence may be set independently of registration of the owner information and/or setting of the turning-on/off of the owner identification display. In the example of FIG. 18, a "user-specified sentence registration" field is provided in an independent user-specified sentence registration menu 56, and FIG. 18 indicates that the cursor 51 is focused. The turning-on/off of the display of the user-specified sentence can also be set in an independent user-specified sentence display setting menu 57. Alternatively, similarly to the example of FIG. 17, in the case of updating the user-specified sentence in the user-specified sentence registration menu 56, illegal rewriting may be suppressed by requiring an input of a password(s) as illustrated in the example of FIG. 19.

As described above, according to the projection type image display apparatus 1 that is an embodiment of the present invention, it is possible to maintain the display of various types of information on the subdisplay configured by the nonvolatile display device 17 such as electronic paper provided to the main body exterior even after the power supply is stopped.

For example, it is possible to improve security such as theft prevention by maintaining the owner identification display even in a state of having no power supply. Moreover, by maintaining the replacement component related display even in the state of having no power supply, it is possible to significantly improve efficiency of maintenance work. Moreover, by maintaining the model attribute identification display even in the state of having no power supply, it is possible to suppress such illegal resale or the like as to improperly alter the model attribute information. Moreover, by maintaining the error display even in the state of having no power supply, it is possible to significantly improve work efficiency of repair work or the like.

It is particularly effective that each of the above-described aspects of the present invention is adopted for a non-battery-driven projection type image display apparatus having difficulty in turning on the light source and controlling a display change of a subdisplay when power supply from an external power source via a power supply line is interrupted.

Alternatively, it is particularly effective that each of the above-described aspects of the present invention is adopted for a projection type image display apparatus mounting no battery for turning on the light source and/or controlling a display change of a subdisplay without a power supply line.

In other words, it is particularly effective that each of the above-described aspects of the present invention is adopted for a projection type image display apparatus turning on the light source and controlling a display change of a subdisplay only when the power supply from an external power supply via the power supply line is available.

In the foregoing, the invention made by the inventors of the present invention has been concretely described based on the embodiments. However, it is needless to say that the present invention is not limited to the foregoing embodiments and various modifications and alterations can be made within the scope of the present invention. For examples, the embodiments above have been described in detail so as to make the present invention easily understood, and the present invention is not always limited to the embodiment having all of the described constituent elements. Also, a part of the configuration of each embodiment as described above can be added to, eliminated from, or replaced with another configuration.

REFERENCE SIGNS LIST

1 . . . Projection type image display apparatus; 3 . . . External power supply; 4 . . . Screen; 11 . . . Power source unit; 12 . . . Light source drive unit; 13 . . . Light source; 14 . . . Illumination optical system; 15 . . . Display element; 16 . . . Projection optical system; 17 . . . Nonvolatile display device; 18 . . . Processing unit; 19 . . . Cooling fan; 20 . . . Image signal input unit; 21 . . . Memory; 22 . . . Nonvolatile memory; 23 . . . Operation input unit; 24 . . . Image signal input terminal; 25 . . . Power source connection unit; 26 . . . Power supply line; 41 . . . Projection image; 50 . . . Setting menu screen; 51 . . . Cursor; 52 . . . Owner information registration menu; 53 . . . Owner identification display setting menu; 54 . . . Replacement component related display setting menu; 55 . . . Model attribute identification display setting menu; 56 . . . User-specified sentence registration menu; and 57 . . . User-specified sentence display setting menu.

The invention claimed is:

1. A projection type image display apparatus having a display element, an image of which is to be projected as a projection image via a projection optical system by using light from a light source, the apparatus comprising:

a power source connector configured to connect a power supply line for supplying, from outside, power used in the projection type image display apparatus;

a nonvolatile display provided independent of the display element and configured to display at least character information; and a processor having information on one or more predetermined items displayed on the nonvolatile display, wherein a state of displaying information on the nonvolatile display is maintained even in a state where the power supply line is not connected to the power source connector, wherein the nonvolatile display displays the plurality of predetermined items including model attribute identification information that is specific attribute information of the projection type image display apparatus and owner information that indicates information related to an owner of the projection type image display apparatus, wherein the projection type image display apparatus projects a setting menu screen for a setting related to display of the predetermined items of the nonvolatile display device, and wherein, via the setting menu, the projection type image display apparatus allows a user to update the contents of the owner information by using a password, but the projection type image display apparatus never allows the user to update the contents of the model attribute identification information after the time of manufacturing of the projection type image display apparatus.

* * * * *